Figure 7A:
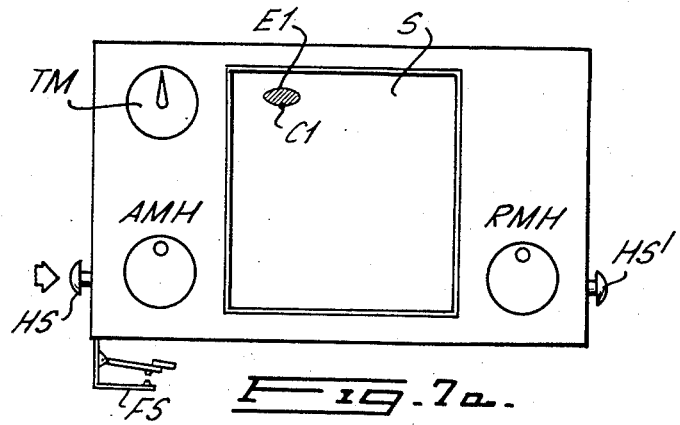

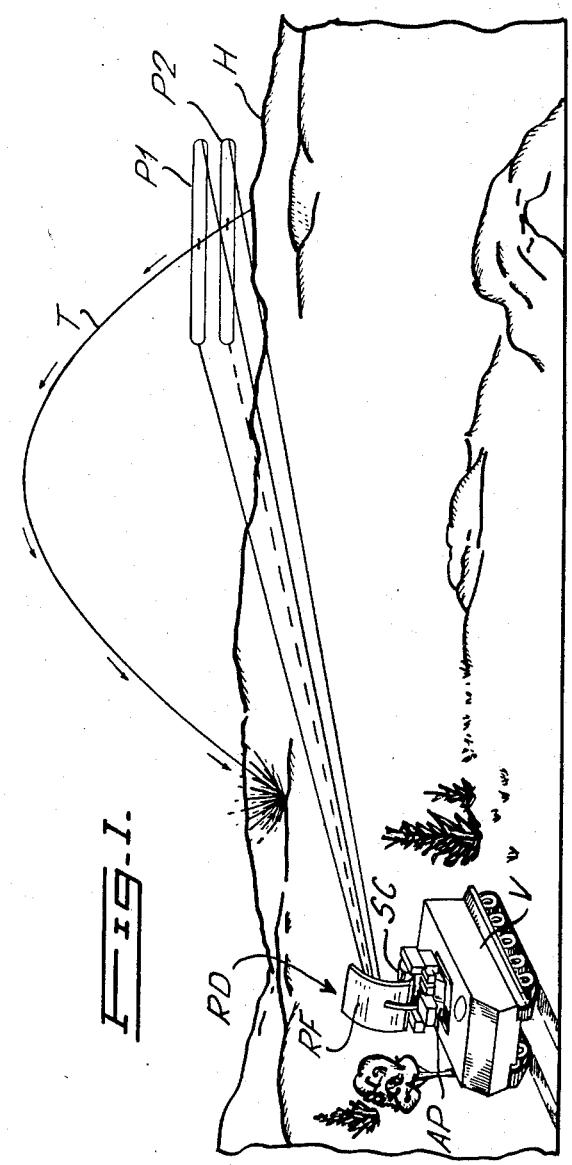

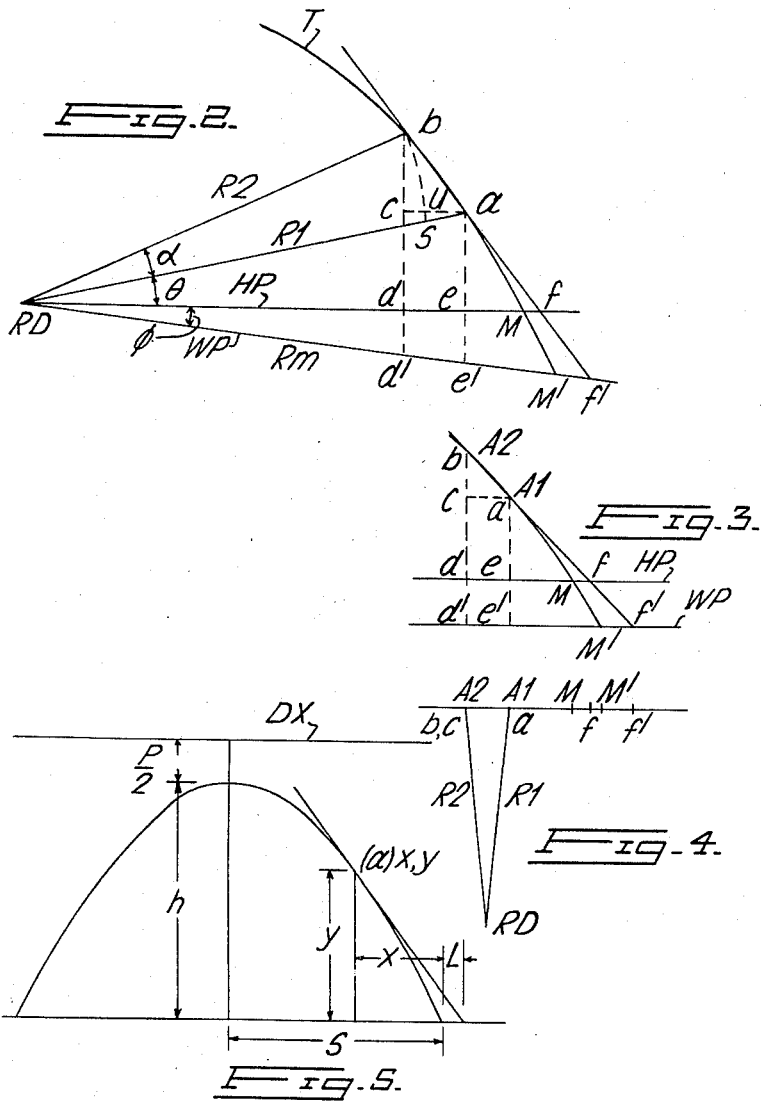

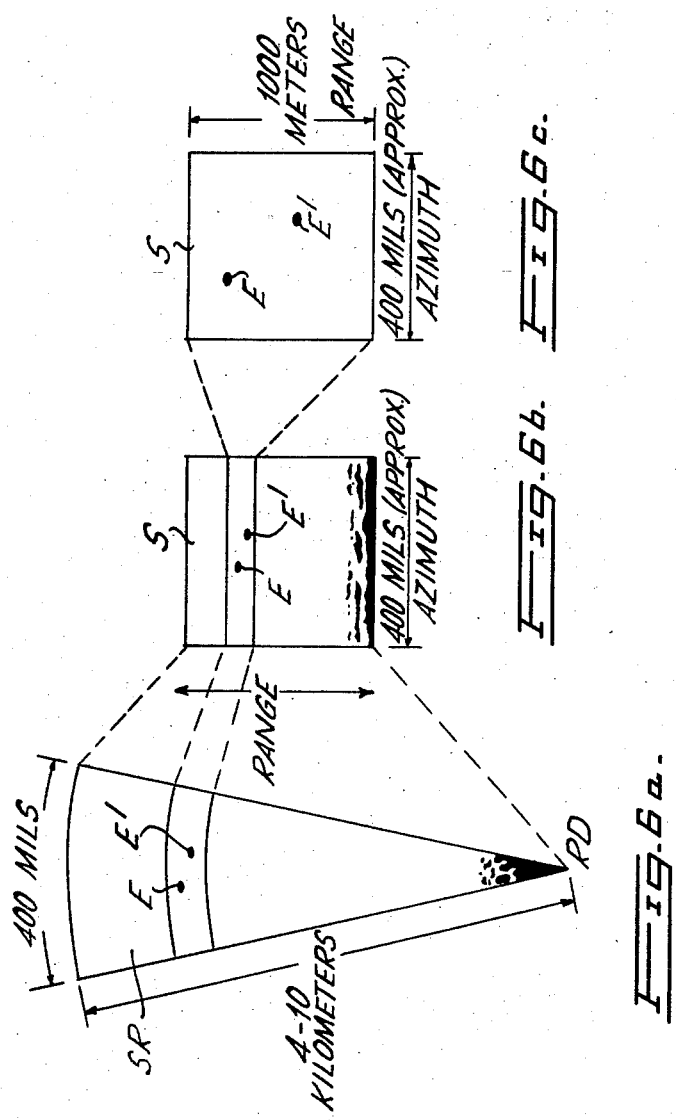

INVENTORS
CHARLES R. CLEMENCE
ERIC F. V. ROBINSON
WILLIAM C. BROWN

BY Cushman, Darby & Cushman
ATTORNEYS

INVENTORS
CHARLES R. CLEMENCE
ERIC F. V. ROBINSON
WILLIAM C. BROWN

By Cushman, Darby & Cushman
ATTORNEYS

INVENTORS
CHARLES R. CLEMENCE
ERIC F. V. ROBINSON
WILLIAM C. BROWN
By Cushman, Darby & Cushman
ATTORNEYS INVENTORS
CHARLES R. CLEMENCE
ERIC F.V. ROBINSON
WILLIAM C. BROWN
By Cushman, Darby & Cushman
ATTORNEYS

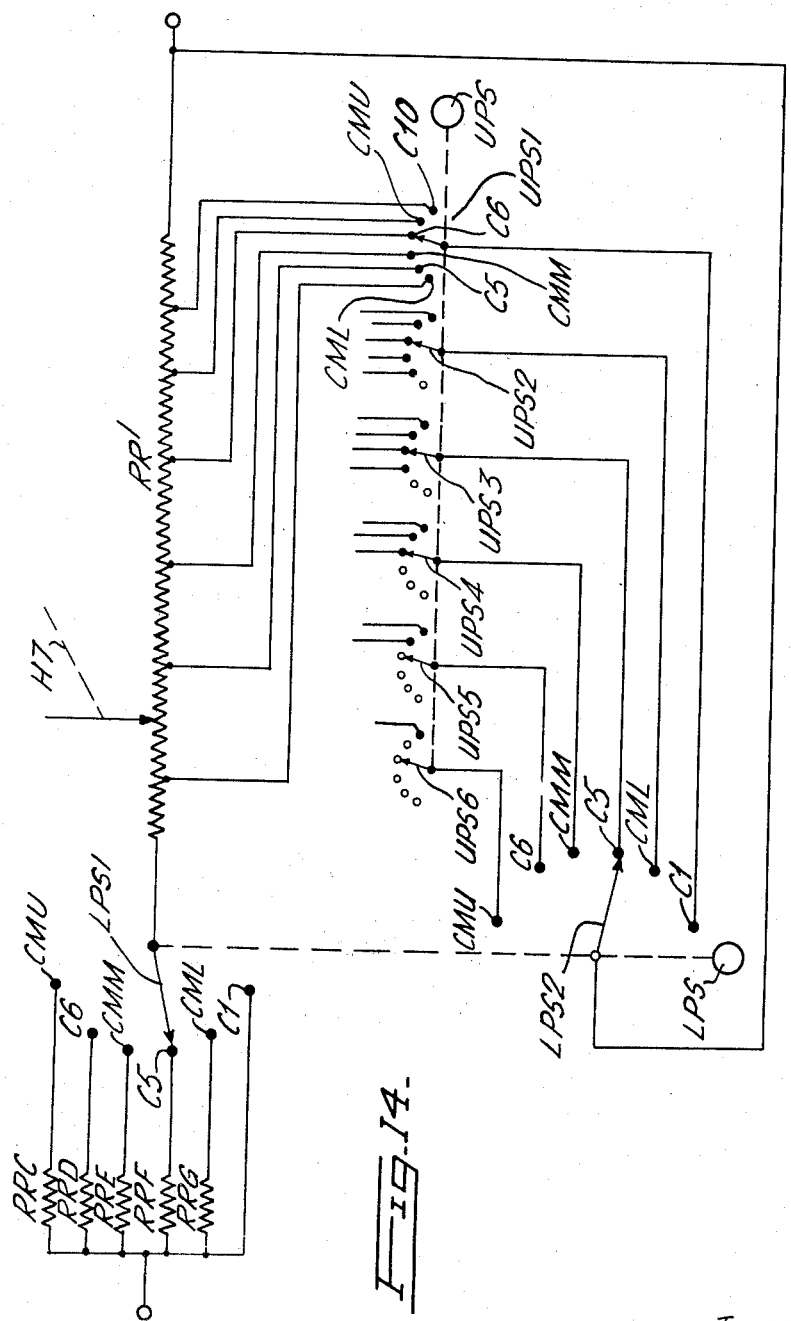

3,182,316
RADAR SYSTEM AND METHOD FOR DETERMINING A TARGET POINT ON A PROJECTILE TRAJECTORY
Charles R. Clemence, Eric F. V. Robinson, and William C. Brown, Ottawa, Ontario, Canada, assignors to National Research Council, Ottawa, Ontario, Canada, a body corporate
Filed Apr. 1, 1963, Ser. No. 269,283
Claims priority, application Canada, Oct. 1, 1962, 859,159
8 Claims. (Cl. 343—7)

This invention relates to a radar system and method, for use in locating enemy weapons by obtaining echoes from the projectiles fired by such weapons.

The invention is concerned with a radar system for determining at least two points through which a projectile passes, the system including a computer for determining the point of intersection of the trajectory of the projectile with the ground from two of such determined points. When desired for greater accuracy, the time interval required for passage of the projectile between said two points is inserted into the computer. Such a system is of particular utility when the weapon is hidden from direct visual or radar observation.

The radar system is equally useful for watching friendly projectiles aimed at the enemy weapon and for determining the points of impact or burst of such friendly projectiles by making the same extrapolation on the trajectory of a falling projectile as for a rising projectile. The point on the ground through which such trajectory extends (whether for a rising or falling projectile) is called the target point. In the general case, the "target point" is the point of intersection of the projectile trajectory with a selected plane referred to as the "working plane." The "working plane" is defined as the one including the line between the radar system and the target point and all horizontal lines perpendicular to said line. The angle of the working plane will generally be chosen to give a ground location for the "target point" unless tactics otherwise demand.

Such a system is described in W. C. Brown et al. United States patent application Serial No. 269,367 filed April 1, 1963. This application describes a system the antenna of which provides a narrow beam substantially circular in cross-section having a width of approximately 16 mils (approximately 1°, a mil being 360°/6400) in both directions. The system causes this narrow beam to scan horizontally through approximately 400 mils (22.5°) alternately in two planes separated in angle by approximately 40 mils (2.25°) at beam centers. This action defines, by the narrow beam locus, two vertically superposed, generally horizontal, fan-shaped beams, each scanned 20 times per second, hereinafter referred to as the upper and lower beams.

Echoes (intercepts) received from each of the upper and lower beams when a projectile passes through it, are displayed on a range-azimuth radar display in two series (one for each of said beams). The duty of the operator is to observe or mark the center points of the leading edges of the first and last echoes received in each of the upper and lower beams and to estimate and mark the mean points between each pair of these two extreme center points. The radar screen is provided with an outer surface that can readily be marked by the operator using a suitable stylus. Having marked the mean center points on the screen, the operator then feeds information concerning the positions of these points into a computer which calculates an extrapolated target point on the working plane through which the projectile trajectory passes. The computer displays the position of this target point in counters as representing the position of the weapon. During the course of this operation, the operator normally also determines $\Delta T$, the time between the projectile being in similar positions in each of the upper and lower beams. Such similar positions can conveniently be the moments when the projectile enters each of said beams.

The system outlined above was developed especially for observing enemy mortar fire, or fire from other high angle weapons. It can similarly be used for watching friendly projectiles and calculating their point of impact or burst, but again the prime purpose of the system has been directed to use with weapons having high angle trajectories.

Nevertheless, the system is inherently capable of detecting and calculating low angle trajectories. Sometimes, however, the much larger differences in range and/or azimuth between the beam intercepts encountered with low angle trajectories are beyond the limits of the system, since system parameters have been selected to provide optimum results with high angle trajectories. Often, if the echoes for one of said upper and lower beams are on the screen, those for the other of said beams will be wholly or partly beyond the edge of the screen. If this occurs in the horizontal dimension of the screen, it means that the projectile has a difference in azimuth between beam intercepts almost as great or even greater than the length of the beam scan (400 mils in the example). To make this value changeable at will, would be a complex and hence undesirable expedient. It would also reduce accuracy. In the range direction (vertically on the screen), the only way to avoid the difficulty of one series of echoes extending beyond the edge of the screen, would be to vary the scale of the range sweep presented. However, this would bring all the echoes closer together and would generally reduce accuracy. Yet another problem posed by larger values of $\Delta R$ and $\Delta A$ (the differences in range and azimuth between beam intercepts), is that of designing the computer to accept the larger values. The computer must be built with some physical limits and the narrower these can be made, the better will be the computer design from the viewpoint of accuracy and economy, provided satisfactory operation under all normal conditions is assured. However, limits that are satisfactory for computing high angle trajectories will often be too restricted for computing low angle trajectories.

The operator's inability to estimate properly the mean point of interception of the projectile trajectory with each of said beams may arise from causes other than the low angle of the trajectory. He may experience adverse operating conditions such as signal fading or interference. Such adverse conditions may prevent the proper display of part or all of the echoes of one or both beams.

The object of the present invention is to provide means for modifying the computer in a manner which will allow its use to be expanded to handle low angle trajectories, or adverse conditions, such means to be used in conjunction with a modified operator's procedure designed to tolerate partial disappearance from the screen of one or more echoes of one or other or both of said beams, or even total disappearance of the echoes of one beam. A further object is to achieve this end without expanding the basic physical limits of the computer and hence without sacrifice to the accuracy attainable during operation under normal conditions (a high angle trajectory and all echoes visible).

This object is achieved by the provision of a radar system comprising (a) Means for emitting two closely vertically superposed, mutually divergent, generally horizontal, effectively continuous, upper and lower radar beams, (b) Means for displaying echoes returned by a projectile travelling in a trajectory intersecting said upper and lower beams for derivation of at least two points of the group comprising (i) A point on the echo received from the lower edge of the lower beam,
(ii) The corresponding point on the echo received from the upper edge of the lower beam,
(iii) The corresponding point on the echo received from the lower edge of the upper beam,
(iv) The corresponding point on the echo received from the upper edge of the upper beam,
(v) The mean point between points (i) and (ii),
(vi) The mean point between points (iii) and (iv), and
(vii) The mean point between the series of echoes received from the lower beam and the series of echoes received from the upper beam (which may be the mean of points (ii) and (iii), or the mean of points (v) and (vi), or the mean of points (i) and (iv), (c) Means for determining range and azimuth values of a selected two of said points measured from the radar system in relation to a known azimuth datum,
(d) A computer,
(e) Means for supplying the computer with said determined range and azimuth values and with the values of the angles each of said upper and lower beams makes with the horizontal and with the value of the angle a working plane makes with the horizontal,
(f) Said computer including means for calculating from said values supplied to it at least approximately a target range value from the radar system of a target point on said working plane through which such trajectory extends and a target azimuth value from the radar system of said target point in relation to said datum,
(g) And said computer further including switching means operable to modify said calculating means in accordance with the combination of two points selected.

The invention also has a method aspect which may be defined broadly as a method of locating a target point that is at the point of intersection of a working plane and the trajectory of a projectile, comprising (a) Emitting from a radar system two closely vertically superposed, mutually divergent, generally horizontal, effectively continuous, upper and lower radar beams to intersect said trajectory,
(b) Determining the angle ($\theta$) the center of the lower beam makes with the horizontal, and the angle ($\alpha$) between the centers of the upper and lower beams,
(c) Estimating the angle ($\phi$) the line lying in the working plane and extending from the radar system to said target point makes with the horizontal,
(d) Displaying on a range-azimuth radar display echoes returned by said projectile during intersection of said upper and lower beams,
(e) Deriving at least two points of the group of points (i) to (vii) defined above,
(f) Selecting a combination of any two of said derived points other than the combination of points (v) and (vi),
(g) And employing the differences in range and azimuth of the points so selected, together with the values of said angles, to solve the equations $$Rm = R1 + K''\Delta R$$
$$Am = A1 + K''\Delta A$$

where
$Rm$ is the target range value of the target point from the radar system,
$Am$ is the target azimuth value of the target point measured from the radar system in relation to a known azimuth datum,
$R1$ is the range value of the lower of said selected points,
$A1$ is the azimuth value of the lower of said selected points in relation to said datum, $\Delta R$ is the difference in range between said selected points,
$\Delta A$ is the difference in azimuth between said selected points, and $$K'' = WK + V$$

where $$K = \frac{\theta + \phi}{\alpha}$$

$$W = \frac{\alpha}{\text{the vertical component of the angle subtended at the radar system by the two selected points}}$$

and $$V = \frac{\text{the vertical component of the angle subtended at the radar system by the lower selected point and point (v)}}{\text{the vertical component of the angle subtended at the radar system by the two selected points}}$$

Figure 7B:
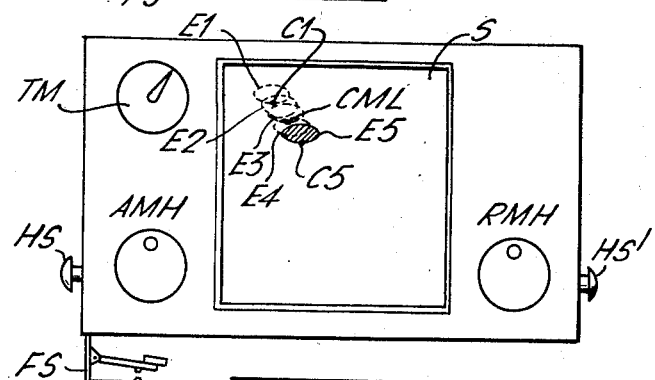
Figure 7C:
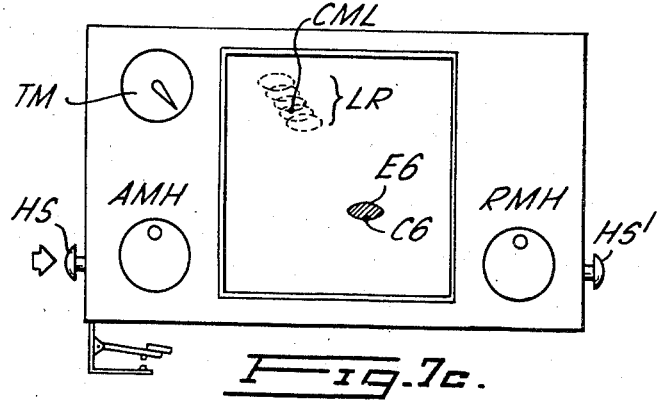
Figure 7D:
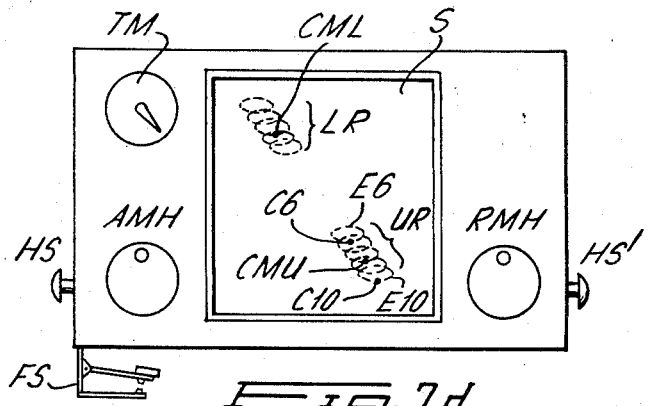
Figure 7E:
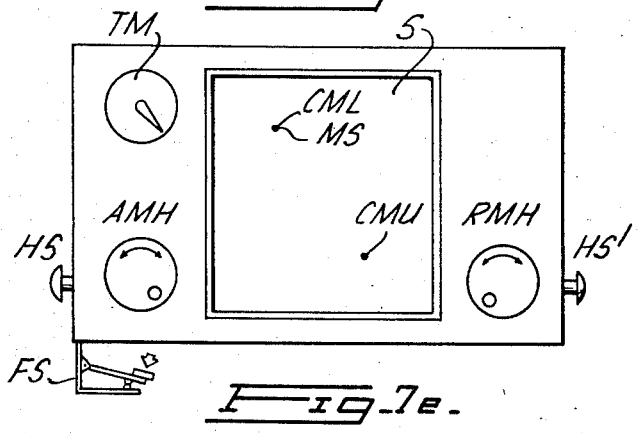
Figure 7F:
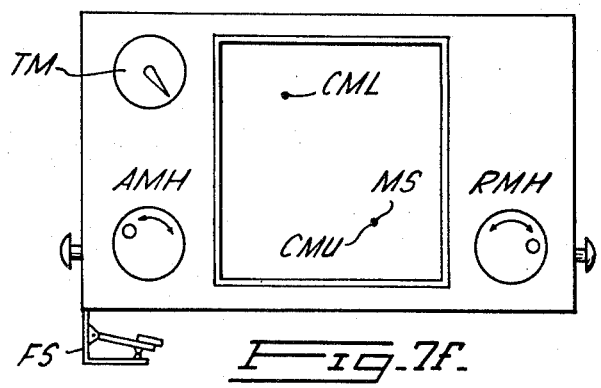
Figure 7G:
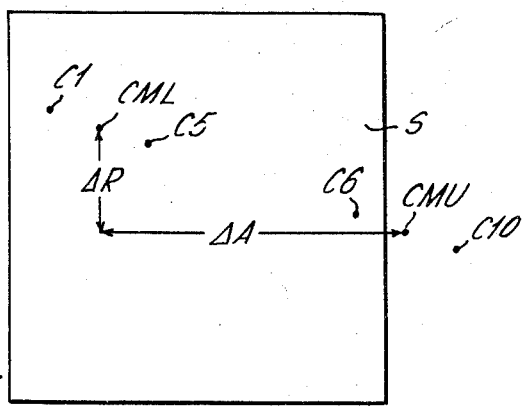
Figure 7H:
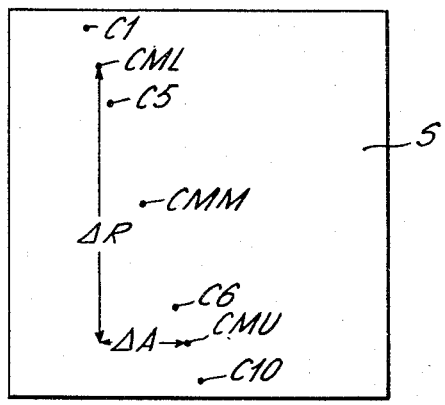
Figure 7I:
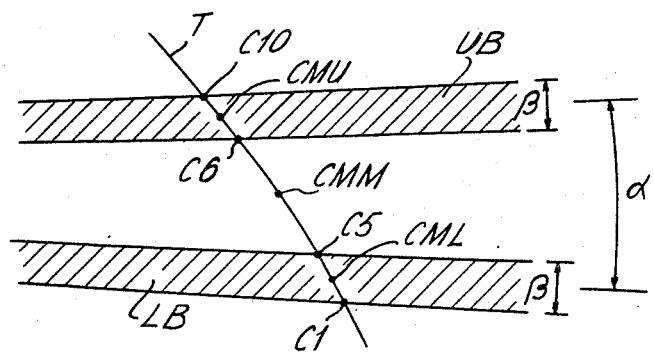
Figure 10:
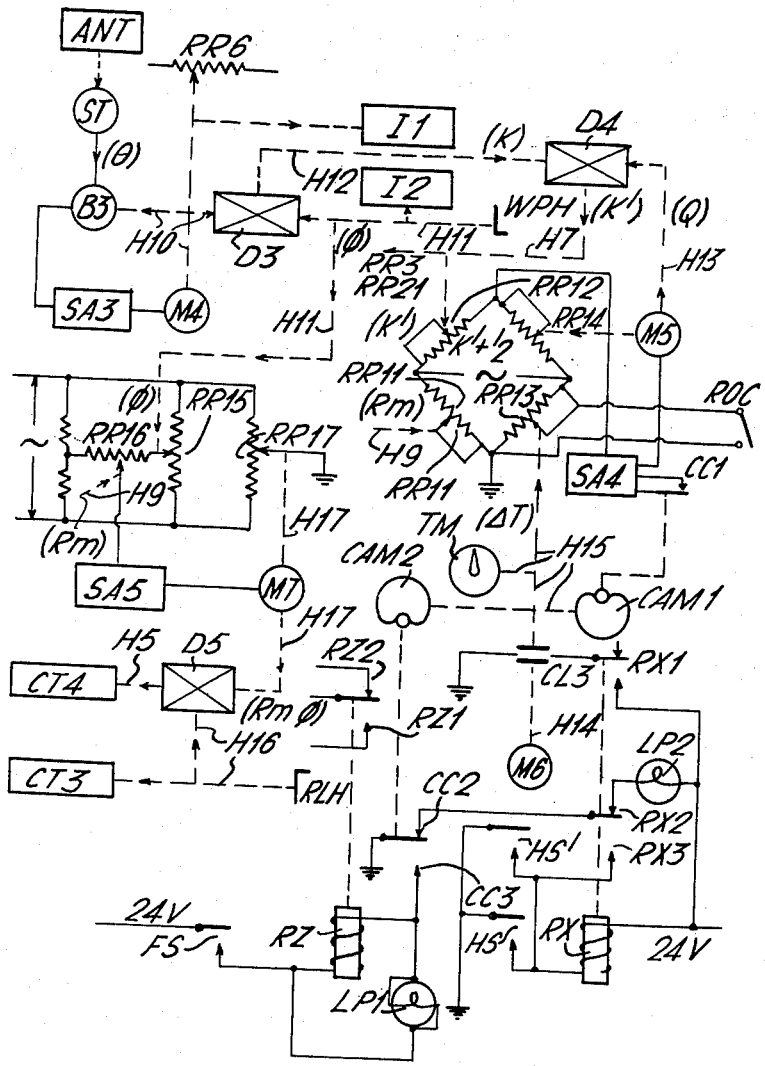
Figure 11:
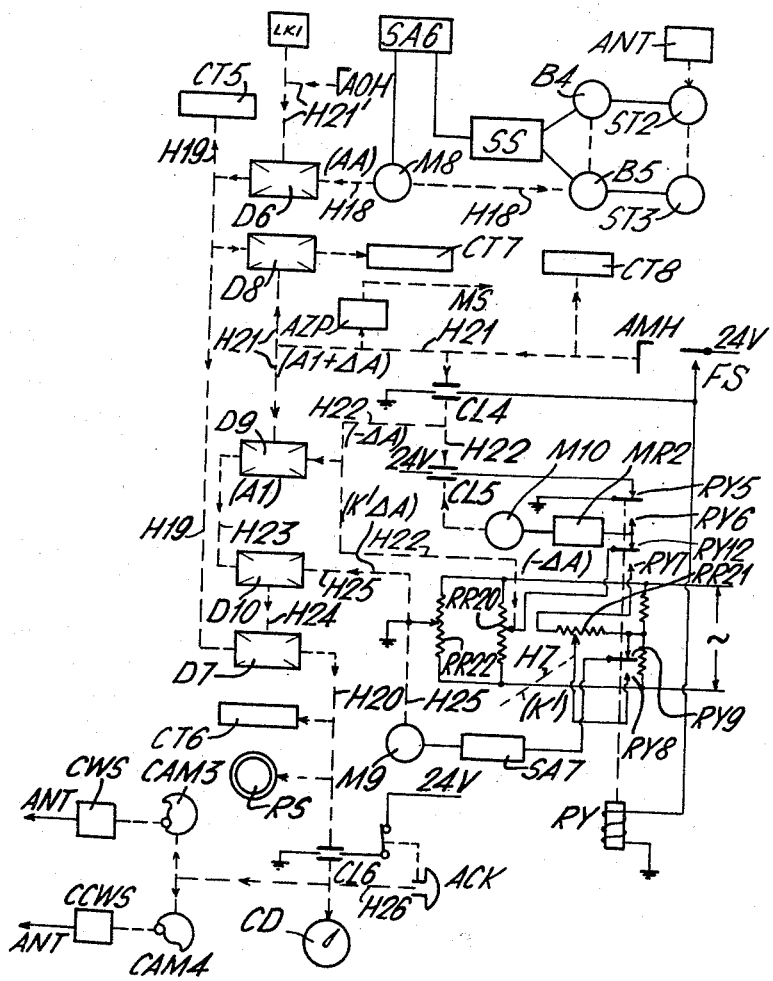
Figure 12:
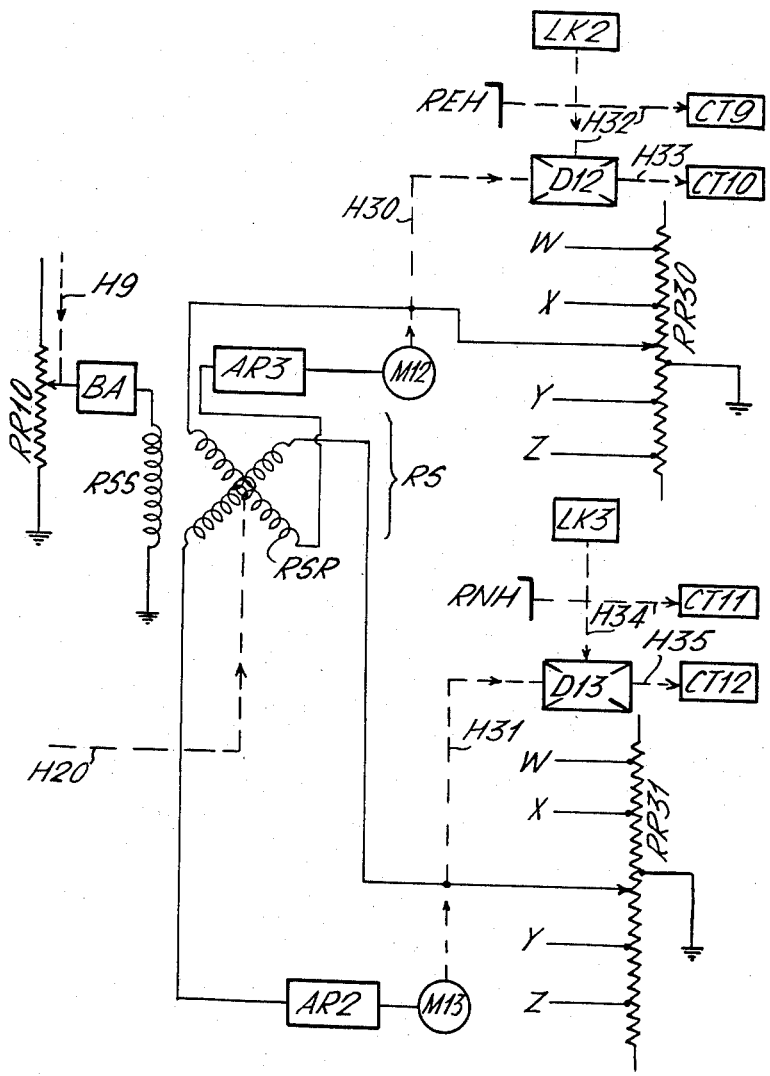
Figure 13:
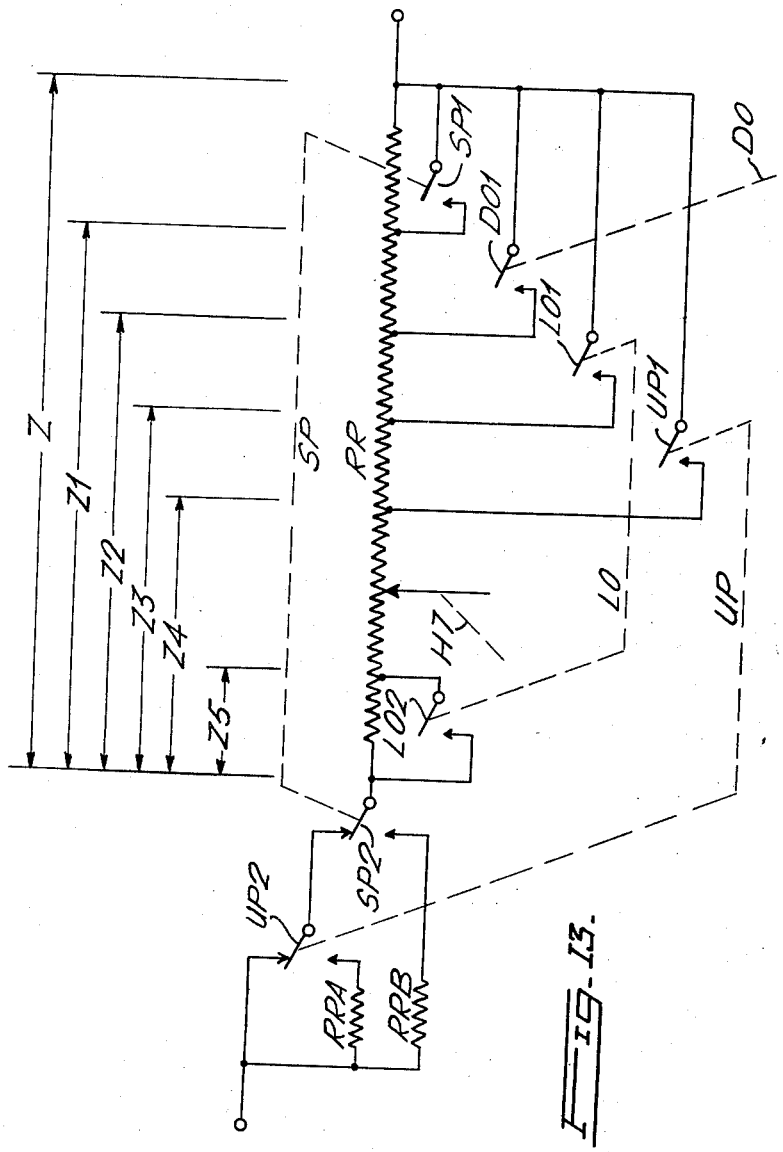

A manner of carrying the invention into practice is illustrated diagrammatically in the accompanying drawings. The specific system illustrated is provided by way of example only, the broad scope of the invention being limited only by the appended claims. In these drawings FIGURE 1 is a general perspective view of a radar system according to the invention in operation,
FIGURE 2 is a first diagram of a typical projectile trajectory,
FIGURE 3 is a further diagram of another projectile trajectory,
FIGURE 4 is a plan view of the diagram of FIGURE 3, also showing the position of the radar system,
FIGURE 5 is another diagram provided to illustrate the geometry of the computations,
FIGURE 6a is a plan view of the area scanned by the radar system,
FIGURE 6b demonstrates the manner of presenting such area of scan (FIGURE 6a) on a radar B-scope during a long range searching sweep,
FIGURE 6c shows a portion of the presentation of FIGURE 6b enlarged as it appears for a short range sweep,
FIGURE 7a is a simplified front view of a portion of the radar control panel illustrating diagrammatically the appearance of an echo of a projectile on the screen,
FIGURE 7b is another view similar to FIGURE 7a, a short time later in operation,
FIGURE 7c is yet another view similar to FIGURES 7a and 7b at a later stage,
FIGURE 7d is another similar view at yet a later stage in the radar observance of a projectile,
FIGURE 7e is a view similar to FIGURES 7a to d showing the marks made by the operator after the projectile echoes have faded and the manner of use of a marker spot,
FIGURE 7f is a view similar to FIGURE 7e at a later stage in operation,
FIGURE 7g is a view of the screen only of FIGURE 7a to f illustrating one manner in which the positions of intercepts are beyond the physical limits of the screen,
FIGURE 7h is another view similar to FIGURE 7g illustrating a manner in which the positions of intercepts may be beyond the physical limits of the computer to handle,
FIGURE 7i is a diagrammatic side view of the upper and lower beams intersecting a projectile trajectory, to provide further illustration of the intercept points shown in FIGURES 7a to h,
FIGURE 8 is a general overall circuit for the radar system,
FIGURE 9 is a more detailed illustration of the portion of the circuit of FIGURE 8 principally concerned with calculating the range of the target point,
FIGURE 10 is a more detailed illustration of the portion of the circuit of FIGURE 8 principally concerned with calculating the elevation of the target point and providing certain parameters to the range and azimuth portions, FIGURE 11 is a more detailed illustration of another portion of the circuit of FIGURE 8 principally concerned with calculating the azimuth of the target point, FIGURE 12 is a detailed illustration of the portion of the circuit provided to display the information in the most conveniently usable form, FIGURE 13 is a detail of the computer circuit incorporating features of the present invention, and FIGURE 14 is a modified circuit as an alternative to FIGURE 13.

*Overall system (FIGURE 1)*

FIGURE 1 shows the radar system RD mounted on a vehicle V being used to observe the trajectory T of a projectile fired by a mortar positioned out of direct visual or radar range behind hills H. The antenna system of the radar system RD provides a narrow beam substantially circular in cross-section having a width of approximately 16 mils (approximately 1°, a mil being 360°/6400) in both directions. The system causes this narrow beam to scan horizontally through approximately 400 mils (22.5°) alternately in two planes P1 and P2 separated in angle by approximately 40 mils (2.25°) at beam centers. This action defines, by the narrow beam locus, two vertically superposed fan-shaped beams, each scanned 20 times per second, hereinafter referred to as the upper and lower beams. This effect is achieved by use of a Foster type scanner SC similar to that disclosed in Foster U.S. Patent No. 2,832,936 issued April 29, 1958, and modified to provide a dual beam in a manner similar to that described in "Mobile Radar Pinpoints Enemy Mortar Positions," by M. S. Jaffee et al. "Electronics" September 18, 1959, page 34 et seq. The scanner SC is placed at the focus of a semi-parabolic cylinder RF which reflects two focused beams. The scanner SC and reflector RF are mounted as an assembly on an antenna platform AP on the vehicle V, which platform is maintained horizontal at all times (see United States Patent application No. 269,363 filed April 1, 1963). The scanner-reflector assembly can be inclined relative to this horizontal platform AP to alter the angle of sight of the beams as a pair while maintaining constant their angular separation. The limits of this adjustment may for practical purposes be set at 212 mils (12°) above the horizontal to 106 mils (6°) below the horizontal, these angles being between the horizontal and the lower beam plane P2. The antenna assembly can be rotated to provide complete radar coverage throughout 6400 mils (360°) in azimuth.

*Mathematics of the computations to be made (FIGURES 2 to 5)*

Before considering the detailed nature of the display which appears on the radar screen as a result of a projectile passing through the upper and lower beams, it is necessary to consider the mathematics of the problem, taking as a first assumption that the echoes received from each beam can be resolved into a single point on the trajectory T of the projectile, the range and azimuth of which point thus becomes known. The angle of sight $\theta$ of the lower beam to the horizontal is known by the setting applied to the scanner-reflector assembly by the operator. In practice, the operator will make this angle of sight as small as he may having regard to the limitations of the terrain. He will normally aim the antenna so that the lower beam just clears the treetops, or other high point, such as the upper outline of the hills H in FIGURE 1. He may be provided with a telescope aligned with the lower beam to facilitate this setting.

FIGURE 2 shows two intercept points $a$ and $b$ on trajectory T determined by the radar system RD at ranges R1 and R2 respectively, it being assumed for simplicity in this first diagram that the trajectory T is directed straight towards the radar system RD with no change in azimuth between points $a$ and $b$. The angle of sight of the lower beam is shown as $\theta$, and the fixed angle between the two beams is designated $\alpha$. The angle $\phi$ represents the difference between the horizontal plane HP through the radar system RD and the working plane WP which is the plane in which both the radar system RD and the target point lie. The target point will be assumed to be occupied by an enemy mortar for the present description. The mortar is in fact positioned at the point M' which is the extrapolation of the trajectory T from points $a$ and $b$ to the working plane WP, assuming the trajectory to be substantially parabolic. Point M would be the position of the mortar if it were on the horizontal plane HP, and points $f$ and $f'$ are the corresponding points on the horizontal and the working planes for a straight line extrapolation from points $a$ and $b$.

It will be appreciated that the angles at which the radar system is working in practice will be very small compared with the angles actually shown in FIGURE 1. It is necessary to exaggerate the size of the angles in FIGURE 1 in order to have a workable diagram. With this point in mind it will be appreciated that many of the approximations employed in the subsequent calculations are in fact a good deal closer to being true than would at first sight appear from FIGURE 1, by reason of the fact that such small angles are encountered in practice.

Consider first the straight line extrapolation back from points $a$ and $b$ to point $f$. Since triangle $bca$ is similar to triangle $aef$ $$\frac{ef}{ae} = \frac{ca}{bc}$$

$$ef = \frac{ae}{bc} \times ca$$

Now, remembering that the angles are small, the following approximations can be made.

$$ca \approx R1 - R2 = \Delta R$$
$$ae \approx R1\theta$$
$$bc \approx R2\alpha \approx R1\alpha$$

$\theta$ and $\alpha$ being expressed in radians.

Thus $$ef \approx \frac{R1\theta}{R1\alpha} \times \Delta R = K\Delta R$$

This function thus represents the correction for straight line extrapolation, where $$K = \frac{\theta}{\alpha} = \text{a constant times } \theta$$

and thus varies with that angle.

As above indicated, the working plane WP is provided to take care of the situation occurring when the position of the mortar M is above or below that of the radar system RD, e.g. at M'. An estimated working plane is initially assumed by the operator as a rough calculation from a contour map, since he knows the general location of the mortar, and is later corrected as required in a manner to be described below. The operator's initial estimate of the working plane angle $\phi$ radians does not affect the angle of sight $\theta$ of the radar's lower beam; it merely plays a part in the calculations.

Taking the working plane WP into account $$e'f' \approx \frac{\theta + \phi}{\alpha} \Delta R = K\Delta R$$

where K now equals $$\frac{\theta + \phi}{\alpha}$$

namely a constant times $(\theta + \phi)$.

The mortar range $Rm$ has now been found as $$R1 + K\Delta R$$

FIGURE 2 assumes that the mortar is firing directly towards the radar system RD. FIGURES 3 and 4 are constructed with a different assumption, namely that the mortar is firing exactly at right angles to the line of sight from the radar system RD. Under these conditions there is a change in azimuth, but no change in range, between the two detected projectile intercepts $a$ and $b$. A1 and A2 (FIGURES 3 and 4) are assumed to be the azimuth angles in radians from a convenient datum (such as North) of the detected points $a$ and $b$.

As FIGURE 4 shows $ca \approx (A1-A2)R = \Delta A \times R$, where $R = R1 = R2$.

Also
$$ae \approx R\theta$$
and
$$bc \approx R\alpha$$
where $\theta$ and $\alpha$ have the meanings already ascribed to them. Consequently $ef \approx K\Delta A \times R$ where $$K = \frac{\phi}{\alpha} \text{ or } \frac{\theta+\phi}{\alpha}$$

as before. The mortar azimuth $Am$ has now been found as $A1 + K\Delta A$.

If the mortar is not firing directly towards the radar system RD or on a line perpendicular to it, but at some angle in between, the same diagrams will apply for the components, and in the general case there will be both $\Delta R$ and $\Delta A$ factors for each trajectory. To visualize $\Delta R$, the trajectory and its intercepts may be visualized as projected on a vertical plane ($\Delta R$ plane) passing through the radar system and mortar, and to visualize $\Delta A$, a similar projection may be made on a plane ($\Delta A$ plane) at right angles to the radar-mortar line. In each case, the trajectory will be fore-shortened by the cosine of the angle between the trajectory plane and the plane on which the projection is made. The motar is located on the ground in polar coordinates to a first approximation as $R1 + K\Delta R$; $A1 + K\Delta A$. The computer can thus determine the mortar position by storing the information R1 and A1, calculating $\Delta R$ and $\Delta A$ from information set in by the operator, and performing the necessary multiplications and additions to obtain the desired result.

The foregoing calculations have been based on a straight line extrapolation and will result in quantities $K\Delta R$ and $K\Delta A$ which are too great and tend to overshoot the actual mortar position, due primarily to the parabolic nature of the actual trajectory T. In other words, the calculations approximately find point $f'$ instead of point $M'$. Due to the assumption that the distance $ac$ in FIGURE 2 is equal to the difference in range $R1 - R2 = \Delta R$ (which assumption is not entirely true), the overshoot error arrived at by assuming a straight line extrapolation is somewhat reduced, at least as far as range is concerned. It is not reduced in azimuth since the assumption just mentioned forms no part of the geometry of FIGURE 3. Indeed, at certain angles of sight and angles of mortar fire, the point $f'$ (as calculated by using the multiplication $K\Delta R$ as explained) can even lie between the mortar $M'$ and the radar system RD in FIGURE 2.

The distance $M'f'$ (or $Mf$) may be found in terms of the parameters of a typical parabolic trajectory with reference to FIGURE 5, Dx being the directrix of the parabola, and $p$ being the semi-latus rectum.

For any parabola $S^2 = 2ph$.

Also $V_{xa}$, the velocity of the projectile in the $x$ direction at point $a$, is equal to the distance travelled, $x$, divided by the time taken. The projectile is assumed to be subject to gravity only, and the horizontal component of the velocity to be constant.

Thus:
$$V_{xa} = \frac{x}{t}$$

Squaring and dividing throughout by $g$, the gravitational constant, gives $$\frac{V_{xa}^2}{g} = \frac{x^2}{gt^2}$$

Now it is also known from the geometry of a parabola that the time taken for a projectile to reach the vertex, $t_h$, is given by the expression $$h = \tfrac{1}{2} g t_h^2$$

When $x = S$ and $t = t_h$, which occurs at the vertex, from the combination of the foregoing equations $$\frac{V_{xa}^2}{g} = \frac{S^2}{2h} = p$$

The vertical component $V_{ya}$ of the projectile velocity at point $a$ is given by the well known expression for a parabolic trajectory $$V_{ya}^2 = 2g(h-y)$$

If now the equation $S^2 = 2ph$ is expanded for any point on the parabola, it becomes $$(S-x)^2 = 2p(h-y)$$

or $$x = \sqrt{2ph} \pm \sqrt{2ph - 2py}$$

with the $+$ sign representing an imaginary case.

The distance $L$ shown in FIGURE 5 is given by the geometry of the system from the relationship $$\frac{x+L}{y} = \frac{\Delta x}{\Delta y}$$

or $$L = \frac{\Delta x}{\Delta y} y - x$$

Taking $$\frac{\Delta x}{\Delta y} = \frac{V_{xa}}{V_{ya}}$$

and using the above expression for $x$ gives $$L = \frac{V_{xa}}{V_{ya}} y - \sqrt{2ph} + \sqrt{2ph - 2py}$$

$$= \frac{\sqrt{gp}}{\sqrt{2g(h-y)}} y - \sqrt{2ph} + \sqrt{2ph - 2py}$$

$$= \frac{\sqrt{p}(2h - 2\sqrt{h}\sqrt{h-y} - y)}{\sqrt{2}\sqrt{h-y}}$$

$$= \sqrt{\frac{p}{2}}[\sqrt{h} - \sqrt{h-y}]^2 \frac{1}{\sqrt{h-y}}$$

$$= \sqrt{\frac{p}{2}}\left[\frac{S}{\sqrt{2p}} - \frac{S-x}{\sqrt{2p}}\right]^2 \frac{1}{\sqrt{h-y}}$$

$$= \sqrt{\frac{2}{p}} \frac{x^2}{4\sqrt{h-y}}$$

If we now substitute in this equation the expressions for $V_{xa}$ and $V_{ya}$, we get $$L = \frac{x^2}{4\sqrt{h-y}}\sqrt{\frac{2}{p}}$$

$$= \frac{x^2}{4} \frac{\sqrt{2g}}{V_{ya}} \frac{\sqrt{2g}}{V_{xa}}$$

$$= \frac{x^2 g}{2 V_{xa} V_{ya}}$$

Now, in the $\Delta R$ plane, $$V_{xa} = \frac{\Delta R}{\Delta T}$$

$$V_{ya} = \frac{R\alpha}{\Delta T}$$

where $\Delta T$ is the time between intercepts.

Also $x = K'\Delta R$, where $K'$ is the corrected value of K to obtain the true mortar position.

Substituting, we get $$\frac{x^2 g}{2V_{xa}V_{ya}} = \frac{(K'\Delta R)^2 g}{2\frac{\Delta R}{\Delta T}\frac{R\alpha}{\Delta T}}$$

$$L = \frac{gK'^2\Delta T^2}{2\alpha R}\Delta R$$

Since the variables $V_{xa}$ and $V_{ya}$ will not be found not at point "$a$" but at a point half-way between "$a$" and "$b$" (see FIGURES 2 to 4) the quantity $K'$ should read $K' + \frac{1}{2}$.

The equation to be solved becomes then $$K\Delta R = K'\Delta R + \frac{g(K'+\frac{1}{2})^2\Delta T^2}{2\alpha R}\Delta R$$

or $$K' = K - \frac{g(K'+\frac{1}{2})^2\Delta T^2}{2\alpha R}$$

$$K' = K - Q$$

Taking $$g = 9.8 \text{ meters/sec.}^2$$

and $$\alpha = 40 \text{ mils} = 0.03925 \text{ radians}$$

$$\frac{g}{2\alpha} = \frac{9.8}{2 \times .03925} = 125$$

This constant is used in conjunction with other constants of the mechanical gearing described below in determining the correction to be applied as a shaft rotation.

In the $\Delta A$ plane (FIGURE 3) a similar procedure may be used.

$$V_{xa} = \frac{R\Delta A}{\Delta T}$$

$$V_{ya} = \frac{R\alpha}{\Delta T}$$

then $$x = K'R\Delta A$$

$$\frac{x^2 g}{2V_{xa}V_{ya}} = \frac{(K'R\Delta A)^2 g}{\frac{2R\Delta AR\alpha}{\Delta T \Delta T}}$$

$$= \frac{gK'^2\Delta T^2 R^2\Delta A^2}{2\alpha R^2 \Delta A}$$

$$= \frac{gK'^2\Delta T^2 \Delta A}{2\alpha}$$

Since this is actual distance, and in this case we require an angular correction, the angle will be $$\frac{gK'^2\Delta T^2}{2\alpha R}\Delta A$$

the same as before.

This expression is also modified further to substitute $K' + \frac{1}{2}$ for $K'$ to become $$\frac{g(K'+\frac{1}{2})^2\Delta T^2}{2\alpha R}\Delta A$$

so that we now have the same multiplier, $K'$, for both $\Delta R$ and $\Delta A$, as given by $$K' = K - \frac{g(K'+\frac{1}{2})^2\Delta T^2}{2\alpha R} = K - Q.$$

The reason for substituting $K' + \frac{1}{2}$ for $K'$ is that $K'$ is the corrected value of K which latter should really be $$\frac{\theta + \phi + \frac{\alpha}{2}}{\alpha}$$

for a point mid-way between $a$ and $b$. This expression $$= \frac{\theta + \phi}{\alpha} + \frac{1}{2}$$

$$= K + \frac{1}{2} \left( \text{or } K' + \frac{1}{2} \text{ corrected} \right)$$

It should be remembered that K and $K'$ are pure (dimensionless) numbers.

Examination of FIGURES 2 and 3 shows that some approximations were made. For example in FIGURE 3 ($\Delta A$ plane)

$$ca \approx \Delta A \times R$$

$$ae \approx R1\theta \quad R1 = R2 = R$$

$$bc \approx R2\phi$$

In FIGURE 2 it is apparent that the greater part of the error is due to the approximation $$ca = R1 - R2 = \Delta R$$

where the distance $as$ is the actual $\Delta R$ and $$as \approx au$$

$$ca = cu + ua$$

The distance $cu$ can be approximately determined by ordinary trigonometry as $$cu \approx \alpha\left(\theta + \frac{\alpha}{2}\right)Rm$$

where $Rm$ is the range from the radar system RD to the mortar $M'$.

This equation is derived from the fact that the distance $bs$ is given by the well known expression $$bs = 2R2 \sin\frac{\alpha}{2}$$

Since the angle between the line $bs$ and the line $cb$ is equal to $$\theta + \frac{\alpha}{2}$$

then $$cu \approx bs \sin\left(\theta + \frac{\alpha}{2}\right)$$

$$\approx 2R2 \sin\frac{\alpha}{2} \sin\left(\theta + \frac{\alpha}{2}\right)$$

$$\approx Rm\alpha\left(\theta + \frac{\alpha}{2}\right)$$

Taking $\alpha = 40$ mils, and $Rm$ in meters, and $\theta$ in mils, this equation becomes $$cu \approx \frac{(\theta + 20)Rm}{25,840}$$

Thus the true target (mortar) position in polar coordinates from the radar system RD, where $Am$ is the angle between North and the line of sight to the target, are given by equations $$Rm = R1 + K'\left[\Delta R + \alpha\left(\theta + \frac{\alpha}{2}\right)Rm\right] \quad (1)$$

and $$Am = A1 + K'\Delta A \quad (2)$$

where $$= \frac{\theta + \phi}{\alpha} - \frac{g(K'+\frac{1}{2})^2\Delta T^2}{2\alpha Rm} \quad (3)$$

These equations have been designated Equations 1, 2 and 3 respectively for ease of subsequent reference to them. It should be pointed out that, in applying the above equations, account must be taken of the sign of $\Delta A$ and $\Delta R$. If A2 is clockwise from A1, $\Delta A$ is negative; and if the mortar is firing away from the radar, $\Delta R$ is negative.

The true target position has thus been determined in plar coordinate $Rm$ and $Am$, and it remains only to convert to rectangular (Cartesian) coordinates. This is done by means of a resolver, the output of which is $$Rm \text{ sine } Am$$

and $$Rm \text{ cosine } Am$$

If the radar position is added to these quantities as Eastings and Northings then $Rm$ sine $Am$+Radar Eastings=Target Eastings
$Rm$ cosine $Am$+Radar Northings=Target Northings Besides determining the target position in plan, the computer will provide an elevation (in feet above sea level) of this position. This is necessary for the operator to determine the correct angle $\phi$ of the working plane WP. The elevation of the target relative to the radar is $Rm$ sine $\phi$ but for simplicity, and because $\phi$ is always small, this is taken as $Rm\phi$. With $\phi$ being measured downwards from the horizontal, the equation for elevation becomes $$-Rm\phi + \text{Radar Elevation} = \text{Target Elevation}$$

The manner of use of this information by the operator is described below.

*Nature of echo presentation and operator's procedure (FIGURES 6 and 7)*

Attention is now directed to FIGURES 6a, b and c. FIGURE 6a shows a plan view of a typical sector SR scanned by the radar RD. Two composite echo displays E and E' produced by the lower and upper beams, respectively, are shown. FIGURE 6b demonstrates the manner in which the sector SR is presented on the screen S of a B-scope, that is to say a scope which exhibits azimuth along the horizontal axis and range along the vertical axis. After having detected a weapon firing, the operator will enlarge the critical area of the sweep as demonstrated by FIGURE 6c.

The echo displays actually received in practice are more complex than those illustrated in FIGURES 6a, b and c, and attention is now transferred to FIGURES 7a to i for a more detailed discussion of the nature of the display on the screen actually observed by the operator.

As a projectile enters the field of scan of the lower beam, an echo E1 is displayed on the screen S by a group of individual signal returns resulting from a single passage of the narrow beam across the projectile. The center of the leading (lower) edge of this echo (point C1) represents the true position of the object (projectile) being observed. As the narrow beam continues to scan, a series of such echoes appears on the screen S. These echoes are indicated as E1 to E5 in FIGURE 7b and make up the composite echo E of FIGURES 6a to c. In reality there may be many more than five individual echoes in this series. Echoes E1 to E4 are shown in broken lines because some fading will have taken place by the time of the last echo E5 appears. Conditions permitting, the duty of the operator is to determine and mark the center points of the leading edges of the first and last echoes and to estimate and mark the mean point between these two extreme center points. The screen is provided with an outer surface that can readily be marked by the operator using a suitable stylus. He marks points C1 and C5 on the screen as echoes E1 and E5 appear, and later estimates and marks the mean point CML. If he cannot conveniently mark the leading edges, he marks the centers or the trailing edges, provided he always uses "corresponding" points.

Assuming that the weapon is firing from left to right and towards the radar system RD, the second series of echoes UR detected by the upper beam and shown as composite echo E' in FIGURES 6a to c appears first as an echo E6 (FIGURE 7c) and continues down to echo E10 (FIGURE 7d). These echoes of the second series will similarly have leading edge center points C6 to C10, the mean point of which is designated CMU. The upper beam echoes will appear in a lower position on the screen S than the lower beam echoes when the weapon is firing towards the radar, since the range will have shortened somewhat by the time the projectile reaches the upper beam.

As well as carrying out the functions just described, the operator will time the interval the projectile takes to pass from the lower to the upper beam. He can do this either by comparing the first echo of each beam, the last echo of each beam or theoretically any pair of corresponding points on the two beams. It has been assumed in FIGURES 7a to h that he uses the first method and records the time between the respective first echoes E1 and E6 of the lower and upper echo series LR and UR. For this purpose, the operator has a push button hand switch HS situated beside the screen S. A right-handed operator will push the switch HS with his left hand, to leave his right hand free for marking the screen S. A second, parallel operating, hand switch HS' is provided for left-handed operators. As FIGURE 7a indicates by an arrow, the operator will push in the switch HS immediately on appearance of the first echo E1 of the lower beam LB. This operation will start the timer TM. When the first echo E6 of the upper beam UB appears (FIGURE 7c) the operator will again push the hand switch HS to stop timer TM which will now remain in its new position indicating and simultaneously inserting into the computer $\Delta T$, the time of travel from the lower to the upper beam by the projectile.

The screen S is also provided with a marker spot MS, which is an electronic marker produced by conventional circuitry in the radar transmitter-receiver combination and synchronised with the scope sweep so as to occupy a single desired position on the screen S determined horizontally by an azimuth marker handwheel AMH and vertically by a range marker handwheel RMH. Reference may be made to E. F. V. Robinson Canadian Patent No. 580,247 issued July 28, 1959, for a description of a system for achieving this result. The operator first moves the marker spot MS by means of the handwheels AMH and RMH to coincide with the point CML and when he has achieved this coincidence he presses a foot switch FS (FIGURE 7e). Depression of switch FS brings the computer into full operation, as will appear in more detail below. Although illustrated simply, the switch FS is a toggle switch of the type commonly employed to raise and lower the headlights of an automobile, that is to say a switch which remains in each acquired position until reactivated by a further depression of the operator's foot to be reversed. As demonstrated by FIGURE 7f, after closing switch FS the operator moves the marker spot MS with handwheels AMH and RMH to the point CMU, while switch FS remains closed. In this way, the operator feeds into the computer the difference in range $\Delta R$ and the difference in azimuth $\Delta A$ between these two points.

Consideration should now be given to FIGURES 7g, h and i which illustrate typical conditions when the system is used to observe a projectile with a low angle trajectory.

FIGURE 7g shows the conditions on screen S for a projectile with a comparatively low angle trajectory fired at a substantial angle to the radar upper and lower beams (to produce a large value of $\Delta A$). Points C1, CML and C5 are on the screen, but of the upper series only point C6 appears. Marks CMU and C10 in FIGURE 7g demonstrate where these points would have been displayed, if they had not been off the screen. It must be remembered that the operator has to estimate points CML and CMU visually, and to do this he must see the extreme points on both sides. FIGURE 7g is merely one example of numerous possible variants of a situation in which all six points cannot be displayed, and in which, as a result, one or both of the mean points CML, CMU cannot be properly determined.

FIGURE 7h shows a different but related situation in which, although all six points can be seen and hence the mean points CML, CMU can be determined, the range difference ΔR is greater than the computer can accept by reason of its physical limits. A similar situation can arise in which the azimuth difference ΔA is greater than the computer can accept by reason of its physical limits.

The present invention avoids these difficulties by providing for modification of the operator's procedure described above and by providing means in the computer for taking the modified procedure into account, without any necessity to expand the physical limits of the computer and hence reduce its inherent accuracy which remains available when operating conditions enable points CML and CMU to be used.

In accordance with the modified procedure, the operator follows basically the same routine as above described, except that he uses a different pair of points, one or the other or both of points CML and CMU being either unavailable (FIGURE 7g), or unusable (FIGURE 7h), or incapable of reasonably accurate estimation (for example by reason of interference with or fading of one or more of the beam edge points C1, C5, C6 and C10). He has a number of choices of the pair of points to use, and the choice he makes will depend on the radar display he has available.

In addition to the six points C1, CML, C5, C6, CMU and C10, a seventh point, the mean point CMM may be derived. This mean point CMM is the mean point between the two series of echoes. In practice it can be derived by taking the mean point between points C5 and C6. This is the preferred method. Alternatively, an acceptable approximation can be obtained by taking the mean of points CML and CMU, or the mean of points C1 and C10.

With seven points potentially available, C1, CML, C5, CMM, C6, CMU and C10 there is a theoretical choice of twenty-one different combinations of any two of these points, including the "normal" combination CML and CMU. There is further room for variation, in that, as indicated above, the center points or trailing edges can be used instead of the leading edges of the echoes. However, if this is done, it must be applied uniformly by always using a pair of points which "correspond" to each other in their position within the physical limits of the respective echoes. The total number of combinations available is thus unchanged.

The operator must always place the marker spot MS first on the lower one of the two points chosen (that is lower in terms of the physical interception in space of beams and projectile—not necessarily lower on the operator's screen), before moving the spot MS to the second chosen point. In any practical situation only some of the twenty-one combinations may be available to the operator. The four combinations from which it is usually preferred to make a choice, when the "normal" combination is unavailable, are described under the titles of "split," "lower," "upper" and "doubler." For the "split" combination the operator takes points C5 and C6. If one of the echo series is entirely absent from the screen (say the upper series), the operator may take the first and last points of the lower beam, points C1 and C5, which is the "lower" combination. Analogously, the "upper" combination takes points C6 and C10 and feeds their mutual differences in range and azimuth into the computer.

As the fourth alternative, especially suited to the FIGURE 7h situation, the operator uses point CMM together with the point CML to feed the computer. This is the "doubler" combination, because the values of ΔR and ΔA fed into the computer are approximately halved and must therefore be effectively doubled therein.

When such operator procedures are followed the computer is modified by switching means described below in connection with FIGURES 13 and 14. Before describing these figures it will be necessary to describe FIGURES 8 to 12.

*Operation of the computer (FIGURES 8 to 12)*

For an understanding of the manner in which the target point is calculated from the information available, reference will now be made to FIGURES 8 to 12.

Figure 8:
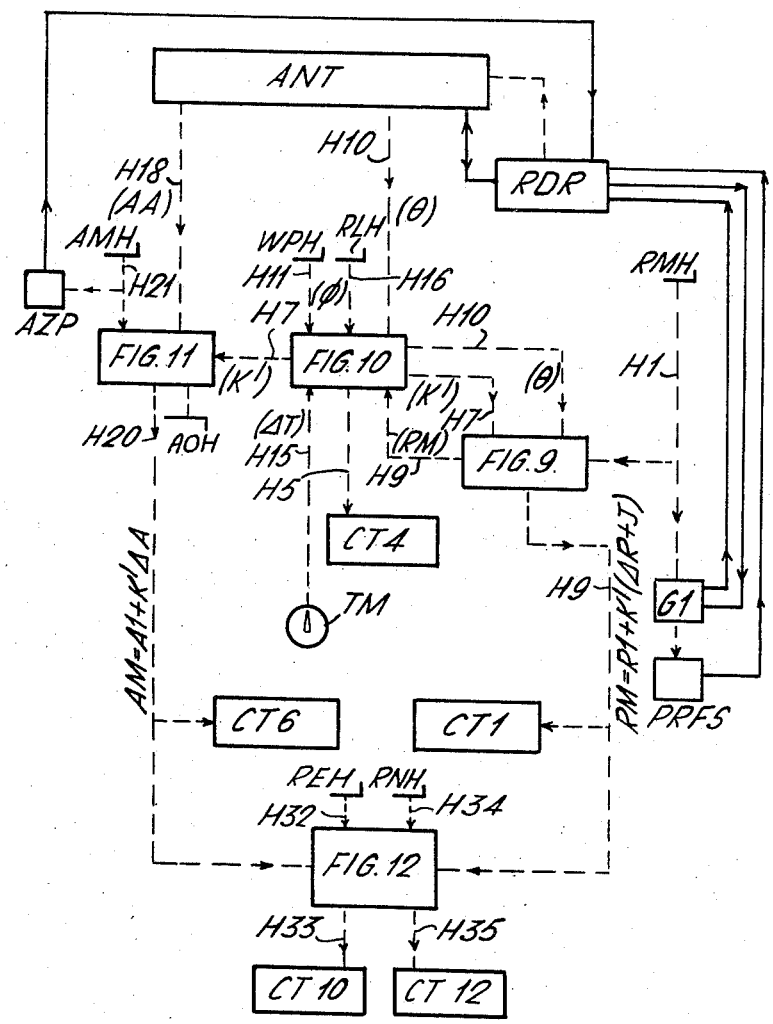
Figure 8:
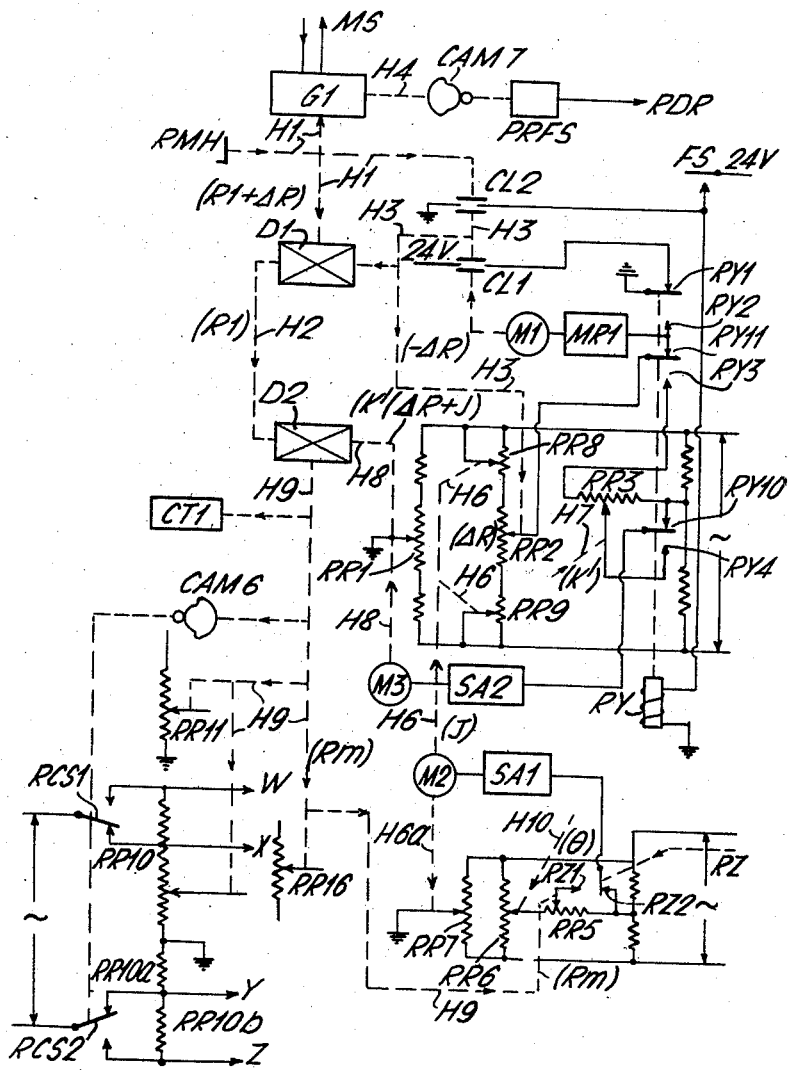

FIGURE 8 shows as a single block RDR a radar transmitter and receiver assembly with related circuits for the B-scope and the electronic marker spot MS. These circuits are conventional and their particular nature forms no part of the present invention. Assembly RDR is coupled electrically and mechanically to the antenna ANT comprising the scanner-reflector assembly already described.

The computer portion of the circuitry which the remainder of FIGURE 8 illustrates in general layout can conveniently be roughly divided into portions which deal respectively with range, elevation, azimuth and information display. These circuit portions are treated separately and in more detail in FIGURES 9, 10, 11 and 12 respectively. Although these circuits are interrelated sufficiently to require some reference to each other in understanding, the description which follows will, as far as possible, take each circuit separately and examine its composition and function. (In all these circuit diagrams, broken lines signify mechanical connection, full lines electrical connection.)

*The range circuit portion (FIGURE 9)*

The range marker handwheel RMH previously described in connection with FIGURE 7 controls movement of the marker spot MS on the screen S in the range direction through a goniometer assembly G1 to which its rotation is transmitted by shaft H1. Goniometer assembly G1 controls the range position of the marker spot MS on the screen. It also, through shaft H4, operates a cam CAM7 which controls a pulse repetition frequency switch PRFS. This switch changes over the radar system from short to long range.

At the same time the handwheel motion is transmitted by shaft H1 to a first input of a mechanical differential D1. Thus, when the marker spot MS is moved to the point CML in FIGURE 7a, the range R1 of such point is fed into the differential D1. As already explained, once the marker spot MS has been aligned with point CML, the operator operates foot switch FS which remains closed. As shown in FIGURE 9, foot switch FS serves to energize a mechanical clutch CL2 which now connects the shaft H1 of the handwheel RMH to shaft H3 which forms another input to differential D1 acting in opposition to shaft H1. As a result, when the marker spot MS is moved by the operator towards point CMU (FIGURE 7f) the output of differential D1, shaft H2, remains stationary since ΔR (the range difference between points CML and CMU) is being inserted twice in opposite senses into differential D1. The position of shaft H2 represents the range value R1, while shaft H3 is moved a distance equal to −ΔR.

Foot switch FS energizes relay RY, one pair of contacts RY1 of which is opened to de-energize a clutch CL1 which had hitherto been holding shaft H3 under the control of a motor M1. Contacts RY2 which are closed by energization of the relay RY serve to ground the input to a motor return amplifier MR1 deenergizing motor M1. The zeroing function of this motor M1 will be described below in connection with the resetting of the system.

The factor −ΔR is transmitted by shaft H3 to a movable slider on a resistor RR2. This part of the circuit is concerned with simulating Equation 1 above, which for convenience is here repeated.

$$Rm = R1 + K'\left[\Delta R + \alpha\left(\theta + \frac{\alpha}{2}\right)Rm\right] \quad (1)$$

If the last term is called J, this equation becomes $$Rm = R1 + K'(\Delta R + J) \quad (1a)$$

And if numerical values are inserted, this equation becomes $$Rm = R1 + K'\left[\Delta R + \frac{(\theta+20)Rm}{25,840}\right] \quad (1b)$$

The factor J is added to ΔR by means of resistors RR8 and RR9 arranged in series with resistor RR2. Resistors RR8 and RR9 each have a movable slider controlled through a shaft H6 by a motor M2 which is made to turn by an amount representing the factor J, as will now be explained. By definition J is equal to the angle of sight θ plus a constant, multiplied by the range Rm, all divided by a further constant. The range Rm is inserted by a shaft H9 controlling a slider on a resistor RR5, and θ (the angle of sight) is inserted by a shaft H10 controlling a slider on a resistor RR6. The constant is added to θ by choice of the initial position. Movement of shaft H10 is controlled by the elevation circuit portion shown in FIGURE 10 and described below. A relay RZ shown in FIGURE 10 controls contacts RZ1 and RZ2 to close the former and open the latter after hand switch HS and foot switch FS have been actuated. Closure of contacts RZ1 connects the resistor RR5 to the input of a servo-amplifier SA1 to impose thereon a voltage representative of the product of the positions of the sliders on resistors RR5 and RR6, namely $Rm(\theta+a$ constant$)$. Servo-amplifier SA1 energizes motor M2 to drive its shaft H6a to reorient the position of a grounded slider on a resistor RR7 in such a way as to restore the input to the amplifier SA1 to zero. This servo-loop thus maintains the shaft H6 at all times at a position representative of the function J, the constant in the denominator of this expression being provided by the mechanical ratio between shafts H6 and H6a.

As noted above, shaft H6 is connected to the movable sliders on resistors RR8 and RR9 whereby the combination of these resistors with resistor RR2 generates the function $\Delta R + J$.

It is now necessary to form the product of such latter function and the function K'. The function K' is inserted into the system of FIGURE 9 at the slider of a resistor RR3 by a shaft H7 the position of which is controlled in the manner subsequently described in connection with FIGURE 10. In FIGURE 9, resistor RR3 is shown as a simple linear resistor. In fact, as explained below, this resistor is a complex device of the form shown in FIGURE 13 or 14. Resistor RR3 is series connected with the slider on resistor RR2 by contacts RY3 which are closed when relay RY is closed and the resulting product output is connected through closed relay contacts RY4 to a servo-amplifier SA2 which controls a motor M3 the shaft H8 of which moves a grounded slider on a resistor RR1 in a manner to restore the input of amplifier SA2 to zero. These parts thus form a second servo-loop whereby the shaft H8 is maintained at all times in an angular position corresponding to the function $K'(\Delta R + J)$.

A second differential D2 receives input from shafts H2 and H8 to form the sum of R1 and $K'(\Delta R+J)$, which sum is Rm in accordance with Equation 1a. The function Rm appears at the output of differential D2, shaft H9, to be fed into target range counter CT1 which indicates the target range. Shaft H9 also moves sliders on resistors RR11 and RR16 for reasons that will appear when FIGURE 10 is considered, moves a slider on a resistor RR10 for a reason that will appear when FIGURE 12 is considered, transmits the Rm function to the slider of resistor RR5 for generation of the J function in the manner already described, and operates a cam CAM6 which actuates range change-over switches RCS1 and RCS2 which change the computer over from short range to long range by altering the supply point of power to resistor RR10 and its preset balancing resistors RR10a and RR10b.

When foot switch FS is reversed to de-energize relay RY, contacts RY10 close to apply the return signal to servo-amplifier SA2 which causes motor M3 to center the slider on resistor RR1. Contacts RY1 also close to energize clutch CL1 to connect shaft H3 (clutch CL2 now being de-energized) to motor M1 for return to zero position under the control of motor return amplifier MR1 which is now connected through contacts RY11 to the slider of resistor RR2. The slider of this ΔR resistor RR2 is thus returned to center position through the zeroing of shaft H3. Contacts RY4 cause motor M3 to return the slider of resistor RR1 to center position. These two potentiometers will then remain in this position until a new problem is set in and the foot switch FS is again pressed to close relay RY.

*The elevation circuit portion (FIGURE 10)*

Turning now to FIGURE 10, the angle of sight θ of the antenna ANT is fed to the computer from a synchro-transmitter ST geared to the antenna. This information concerning the value of θ is applied to the stator of a control transformer B3 and develops an error voltage in its rotor, which voltage is applied as an input signal to a servo-amplifier SA3 controlling a motor M4, the output shaft H10 of which turns the rotor of control transformer B3 to cancel out the error voltage and thus complete the servo-loop. Shaft H10 also controls the slider on resistor RR6 as already described in FIGURE 9, feeds to an angle of sight indicator I1, and is applied as an input to a differential D3.

As already explained, the operator commences by estimating the working plane WP from a contour map and by setting such estimate of the angle φ on a working plane handwheel WPH. The shaft H11 of handwheel WPH transmits motion to a working plane indicator 12, as well as to a second input of differential D3 and to the slider of resistor RR15. The output of differential D3 is a shaft H12 which thus represents the factor $(\theta+\phi)$. By adjustment of the gear ratio this factor can be divided by a constant to derive the factor K which equals $$\frac{\theta+\phi}{\alpha}$$

α being a constant. Shaft H12 thus feeds K as an input to another differential D4 where the factor K' is derived by subtracting the function Q from K. See Equation 3 above.

$$K' = K - Q$$
$$= \frac{\theta+\phi}{\alpha} - \frac{g(K'+\frac{1}{2})^2\Delta T^2}{2\alpha Rm}$$

The output of differential D4 (representing K') is applied to shaft H7 which, as already indicated, is fed to the slider of resistor RR3 in FIGURE 9. It is also fed to the slider of a resistor RR21 of the azimuth portion of the circuit to be described in connection with FIGURE 11, and to the slider of a resistor RR12 of a circuit now to be described.

The factor Q applied to differential D4 by shaft H13 is derived in another servo-loop formed as a bridge. The inputs are factor Rm at resistor RR11 (from FIGURE 9), factor K' at resistor RR12 (which resistor by virtue of additional end turns is made to represent the function $K'+\frac{1}{2}$), and ΔT, the time function, at resistor RR13. (Derivation of factor ΔT will be explained below.) Servo-amplifier SA4 monitors the output of the bridge and controls a motor M5 to restore equilibrium by movement of the slider of a resistor RR14 forming the fourth arm of the bridge. The position of motor M5 is also transmitted by shaft H13 to differential D4. The resistors RR12 and RR13 at which factors $K'+\frac{1}{2}$ and ΔT are inserted are wound as square law potentiometers. Resistors RR11 and RR14 are linear. By appropriate adjustment of the constants, the factor Q is obtained at shaft H13 equal to $$125\frac{(K'\frac{1}{2})^2\Delta T^2}{Rm}$$

Servo-amplifier SA4 is cam controlled through contacts

CC1 from the ΔT circuit, so that this servo-loop can only function when ΔT has been set into the computer.

The ΔT circuit (FIGURE 10) operates as follows. Motor M16 is a continuously running synchronous motor and its shaft H14 can be connected to shaft H15 controlling resistor RR13 and cams CAM1 and CAM2 by means of a clutch CL3. Clutch CL3 is energized through contacts RX1 of a latch relay RX controlled by hand switches HS and HS' previously described in connection with FIGURE 7a. The relay RX is of a type which latches alternately in and out upon subsequent energizations. Upon being latched in by initial actuation of say switch HS as demonstrated in FIGURE 7a, contacts RX1 are closed to energize clutch CL3 and transmit the rotation of the motor M6 to shaft H15 thus beginning to count the factor ΔT on timer TM. Indicating lamp LP2 is de-energized at this time by opening of contacts RX2.

As soon as shaft H15 starts to turn, cam CAM1 closes contacts CC1 to permit the servo-loop of servo-amplifier SA4 to operate, and cam CAM2 opens its contacts CC2 and closes its contacts CC3. Assuming that hand switch HS or HS' is again actuated by the operator before cams CAM1 and CAM2 and timer TM have completed one full rotation (as in FIGURE 7c), contacts CC1, CC2 and CC3 remain in their new positions when, upon the second closing of switch HS or HS', the relay RX is returned to its initial position to de-energize clutch CL3 and leave shaft H15 in the position it has acquired representing the factor ΔT. With this ΔT information thus stored in shaft H15, as soon as the foot switch FS is closed (FIGURE 7e) a circuit is completed through closed contacts CC3 to energize a relay RZ which closes contacts RZ1 and opens contacts RZ2 in the circuit generating the J function (see FIGURE 9). At the same time indicating lamp LP1 is lit. In this way the J function can only be applied when the ΔT factor has been set in and the foot switch FS is in the actuated position. However, if the projectile is known to be of the type having a straight line trajectory such as a self-propelled rocket, it is possible to retain the J function while removing the Q factor from the equations. This effect is achieved by closing a rocket switch ROC which short circuits the active portion of resistor RR13. The result is an approximately straight line extrapolation, the most appropriate for this type of projectile.

Another part of the circuit shown in FIGURE 10 is that derived from the shaft H11 of the working plane handwheel WPH to control the position of a slider on a resistor RR15. This part of the circuit is designed to derive the elevation, which is a function of the working plane angle $\phi$ and of the range $R_m$ which is applied by movement of a slider on a resistor RR16 (FIGURE 9). This is another servo-loop consisting of a servo-amplifier SA5 controlling motor M7, the output shaft H17 of which adjusts resistor RR17 to restore the input of amplifier SA5 to zero while the output from shaft H17 is also fed to another differential D5. The known elevation of the radar system is applied at radar elevation handwheel RLH and is fed by shaft H16 to appear directly in counter CT3 while being added in differential D5 to the difference in elevation between the radar system and the target, $R_{m\phi}$, as determined by the chosen working plane, to give the elevation of the target in shaft H5 and counter CT4.

In operation, once the operator has a first reading of the target point, he checks to see if the elevation appearing in counter CT4 agrees with the elevation shown on his map of the target location. If it does not, he turns the working plane handwheel WPH until the counter CT4 shows the elevation given by the map at the target location as determined by the computer. This adjustment is automatically applied to all the other dependent variables in the system and a new location is immediately computed. The operator then rechecks the map elevation and makes a further adjustment if necessary (normally only one resetting is required).

*The azimuth circuit portion (FIGURE 11)*

We come now to consideration of the manner of determining azimuth, for which purpose reference should be made to FIGURE 11. Information concerning the antenna azimuth AA is supplied to the computer by an assembly consisting of two synchro-transmitters ST2 and ST3, one geared directly to antenna azimuth rotation and the other (vernier) rotating 15 times per antenna rotation. The synchro information is applied to the stator of respective main and vernier control transformers B4 and B5. Since these rotors are not free to turn, an error voltage is developed in one or both rotors if they are not aligned with the actual antenna position. These error voltages are applied to a signal selector SS which receives inputs from the rotors of both the main and vernier transformers B4 and B5. As soon as the input from the main control transformer B4 is above a specific voltage level then this error signal controls the output of the signal selector SS. When the error signal from transformer B4 drops below this level, i.e. approaches a null, then any signal being developed by the vernier control transformer B5 becomes the controlling voltage and is passed by the signal selector SS. The output of signal selector SS passes to a servo-amplifier SA6, and the servo-loop is completed by a motor M8, the shaft H18 of which is connected to the rotors of transformers B4 and B5. Motor M8 thus drives the control transformers to their correct nulls. Should the main control transformer B4 reach its wrong null, i.e. 3,200 mils out, then the controlling voltage from the vernier control transformer B5 will drive the servo away from this null towards the correct one, so that the system will only stabilize itself on the correct azimuth setting.

Shaft H18 of motor M8 also drives through a differential D6 to appear on an antenna azimuth counter CT5 via shaft H19, which also transmits this motion through a differential D7 to a shaft H20 and a target azimuth counter CT6. An azimuth orient handwheel AOH controls a shaft H21' also feeding into differential D6. In setting up, this handwheel AOH is rotated until the antenna azimuth counter CT5 reads the correct bearing of the center of scan of the antenna to a known target. In this way the antenna azimuth is oriented in respect to a compass bearing such as North. Shaft H21' is then locked by lock LK1.

Shaft H19 also feeds into a further differential D8 which receives a second input from the azimuth marker handwheel AMH via shaft H21. The output of differential D8 is recorded in an antenna + marker counter CT7. An azimuth potentiometer AZP controlled by shaft H21 controls the position of the marker spot MS in azimuth on the screen S. In addition to driving differential D8 the azimuth marker handwheel AMH also drives differential D9, a ± marker counter CT8, and one side of a clutch CL4.

Differential D9 may be considered as a storage device. It functions so as to have an output which indicates the position of the marker spot MS at the first intercept point CML. When the marker spot MS is aligned with point CML (FIGURE 7e) the foot switch FS is closed to energize clutch CL4 so that any further motion of the azimuth marker handwheel AMH is applied both directly to differential D9 by shaft H21, and in opposite sign to the same differential through clutch CL4 and shaft H22. Such applications thus subtract from one another. Differential D9 effectively stores the azimuth position of the marker spot MS at the point CML, namely A1, and passes this information on through shaft H23 to differential D10.

Shaft H22 which only starts to turn after foot switch FS closes clutch CL4 thus provides a measure of ΔA, the difference in azimuth, and this function is transmitted to a slider on a resistor RR20 of a further servo-loop designed to provide the multiple K'ΔA. As in the case of resistor RR3, the resistor RR21 is actually a complex device such as shown in FIGURE 13 or 14. The factor K' is inserted at the slider of resistor RR21 being obtained from shaft H7 of the FIGURE 10 circuit. Resistor RR21 is series connected by contacts RY7 of relay RY (when energized by foot switch FS) with the slider of resistor RR20. The output which traverses now closed contacts RY8 appears at the input of servo-amplifier SA7 to control the position of motor M9 which in turn controls the slider of a resistor RR22 through shaft H25 in a manner to restore the circuit to balance.

The position of shaft H25 then represents the function $K'\Delta A$ which is applied at differential D10 to be added to factor A1 and hence transmitted through shaft H24 to be added in differential D7 to the antenna azimuth to provide an output in shaft H20 which represents target azimuth, $Am$. See Equation 2, $Am = A1 + K'\Delta A$. This value $Am$ appears in target azimuth counter CT6 and is also fed to a resolver RS shown in more detail in FIGURE 12.

When foot switch FS is reversed to de-energize relay RY, contacts RY9 close to apply the return signal to servo-amplifier SA7 which causes motor M9 to center the slider on resistor RR22. Contacts RY5 also close to energize clutch CL5 to connect shaft H22 (clutch CL4 now being de-energized) to motor M10 for return to zero position under the control of motor return amplifier MR2 which is now connected through contacts RY12 to the slider on resistor RR20. The slider of this $\Delta A$ resistor RR20 is thus returned to center position through the zeroing of shaft H22. Contacts RY9 closing causes motor M9 to return the slider of resistor RR22 to center position. These two potentiometers will then remain in this position until a new problem is set in and the foot switch FS is again pressed to close relay RY.

When echoes appear too close to the edge of the screen S, a centering device incorporated in the circuit portion of FIGURE 11 allows the centering of the radar scan on the position of these echoes. The amount and direction of rotation of the antenna may be initially determined by the azimuth marker spot setting or approximated by the operator and set on centering dial CD through shaft H26 by azimuth centering knob ACK. Clutch CL6 and the antenna relays are de-energized while knob ACK is being turned, but operate as soon as torque is removed from the centering knob. Shaft H26 also controls cams CAM3 and CAM4 which respectively operate clockwise antenna rotation switch CWS and counter-clockwise antenna rotation switch CCWS. These switches control the antenna ANT so that it will rotate automatically in the direction and the amount set on dial CD.

As a second embodiment of this azimuth centering device (not illustrated), the cams CAM3 and CAM4 are both attached to shaft H21 instead of shaft H20. A suitable clutch arrangement is then provided coupling the antenna azimuth shaft H18 to the shaft H21. A manual switch provides excitation for this clutch arrangement as well as for switches CWS and CCWS which remain mechanically actuated by cams CAM3 and CAM4 to cause the antenna to rotate automatically until the marker spot displacement is removed. This thus constitutes a fully automatic azimuth centering device.

*The information circuit portion (FIGURE 12)*

FIGURE 12 shows the information portion of the system which is provided to convert the target ranges and azimuths to Eastings and Northings. This is accomplished by obtaining a voltage proportional to target range $Rm$ from resistor RR10 (see also FIGURE 9) and applying this voltage to the stator RSS of the resolver RS through a booster amplifier BA, while the rotor RSR of the resolver RS is rotated in proportion to the target azimuth $Am$ obtained from the shaft H20 of FIGURE 11. The outputs of the windings of the resolver rotor RSR are then proportional to $Rm$ sine $Am$ for Eastings and $Rm$ cosine $Am$ for Northings, such Eastings and Northings being the relative Eastings and Northings of the target in relation to the radar system. Amplifier AR3 and motor M12 form a servo-loop for the Eastings with an output in shaft H30 which drives a slider on resistor RR30 until its voltage is exactly equal and opposite to that generated in the rotor winding of resolver RS to which such slider is connected. Similarly, amplifier AR2 and motor M13 form a servo-loop for the Northings giving an output in shaft H31 driving the slider of resistor RR31. Resistors RR30 and RR31 are supplied with power from points W, X, Y and Z as indicated from FIGURE 9. A differential D12 driven by shaft H30 has the known radar Eastings applied to it by radar Eastings handwheel REH and shaft H32. A differential D13 driven by shaft H31 has the known radar Northings applied to it by radar Northings handwheel RNH and shaft H34. Absolute radar Eastings appears in counter CT9, while the sum of shafts H30 and H32 appears in shaft H33 as the target Eastings (that is the absolute target Eastings) and is displayed in counter CT10. In a similar manner, absolute radar Northings appears in counter CT11, while the sum of shafts H31 and H34 appears in shaft H35 as the target Northings (that is absolute target Northings) and is displayed in counter CT12. Shafts H32 and H34 are normally clamped by locks LK2 and LK3.

*Reconsideration of overall system*

Returning to a consideration of FIGURE 8 in the light of the details of FIGURES 9 to 12, it will be observed that each of these figures has been shown as a single block in FIGURE 8, although certain of their parts such as handwheels, counters and shafts have been shown separately for emphasis. FIGURE 8 is intended to illustrate concisely the interrelationship of the circuits of FIGURES 9 to 12, and to show the principal functions that are exchanged mechanically and electrically between these circuits.

The inputs to the computer supplied by the operator are

AMH, the azimuth marker handwheel
RMH, the range marker handwheel
WPH, the working plane handwheel
RLH, the radar elevation handwheel
REH, the radar Eastings handwheel
RNH, the radar Northings handwheel
AOH, the azimuth orient handwheel
and
$\Delta T$, the time interval between observing the projectile in a like position in the lower and upper beams.

The information obtained from the antenna comprises $\theta$, the angle of sight, and
AA, the antenna azimuth.

The principal outputs are in

CT4, the target elevation counter
CT6, the target azimuth counter
CT1, the target range counter
CT10, the target Eastings counter
CT12, the target Northings counter As explained above, one of the most important aspects of the system described is its ability to furnish information about the position of the target point to friendly gunners in directly usable form (polar coordinates) thus enabling rapid counter-fire from guns near the radar system. Such information appears in counters CT1 and CT6 which can be provided with repeaters mounted at the gun site to minimise communication time.

To take care of situations where the displacement between the radar system and the friendly weapons is not negligible, information is simultaneously available in Cartesian (grid) coordinates for directing the fire of such weapons.

If it is desired to determine any target point on the trajectory other than its point of intersection with the ground, the operator may incline the working plane until the required height appears in target elevation counter CT4. This facility is particularly valuable in directing friendly fire when the shells are fused for air burst.

*Resetting produced (FIGURES 9 and 11)*

After making an observation and computation as above described, the operator resets the computer by depressing the foot switch FS for a second time to open its contacts and de-energize relays RY and RZ. The K'ΔA and K'(ΔR+J) shafts H25 and H8 are returned to zero by motor M9 and M3 as described and the ΔR and ΔA shafts H3 and H22 are also returned to zero by motors M1 and M10. The operator again presses his hand switch HS (or HS') to re-energize relay RX and re-engage clutch CL3 so that shaft H15 again starts to turn. Such motion continues until cams CAM1 and CAM2 and timer TM each complete one full revolution. Resistor RR13 similarly completes one excursion (revolution) to return to its zero position. Cam CAM1 opens contacts CC1 which causes servo-amplifier SA4 to operate motor M5 to return the slider of resistor RR14 to zero and then become de-energized. Cam CAM 2 opens contacts CC3 and closes contacts CC2. Closing of contacts CC2 completes a circuit through contacts RX3 of relay RX to re-pulse this relay to return it to and latch it in the position in which contacts RX1 and RX3 are open. This opens clutch CL3 to stop shaft H15 with the cams in their zero positions. Now closed contacts CC2 and RX2 relight lamp LP2 to indicate that resetting has occurred.

The system is now in readiness for a new set of values to be fed into it when the operator observes another projectile in flight.

*Computer modification for low angle trajectory operation (FIGURES 13 and 14)*

FIGURE 13 shows a resistor RR which represents both the resistors RR3 and RR21 in FIGURES 9 and 11, which perform like functions in that they both serve to receive on their sliders the function K' from shaft H7. Resistor RR3 passes this function into the computation of R$m$, the target range, while resistor RR21 passes it into the computation of A$m$, the target azimuth. The modifications now to be described in connection with FIGURE 13 serve to transform the function K' (or K, since ΔT will normally be kept at zero when operating "split," "lower" or "upper") into a related function K" which takes into account the change in operator's procedure that has been adopted. More precisely it cancels out the effect of this change in operator's procedure, so that the final values for R$m$ and A$m$ emerge correct, as if there had never been any need to make such a change. The degree to which K' requires modification to become K" is determined by the error introduced by the change in operator's procedure in accordance with equation $$K'' = WK' + V$$

where

W = the vertical component of the angle subtended at the radar system by points CML and CMU (the angle α) for which the basic computer constants have been designed
    ———————————————————————————
    the vertical component of the angle subtended at the radar system by the two selected points and

V = the vertical component of the angle subtended at the radar system by point CML and the lower of the two selected points (the vertical angular shift from the point CML to the point at which the computer is actuated)
    ———————————————————————————
    the vertical component of the angle subtended at the radar system by the two selected points If the beam width is called β and the beam spacing α (see FIGURE 7*i*), both α and β being the vertical angles in mils subtended at the radar system, then for the "upper" combination (using points C6 and C10)

$$K'' \text{ (upper)} = \left(\frac{CMU-CML}{C10-C6}\right)K' + \left(\frac{C6-CML}{C10-C6}\right)$$

(where the difference between two points, e.g. CMU−CML, designates the vertical component of the angle subtended at the radar system by these two points)

$$= \frac{\alpha K'}{\beta} + \frac{\alpha - \frac{1}{2}\beta}{\beta} \qquad (4)$$

Substituting the numerical values of the example given above, namely $$\alpha = 40 \text{ mils}$$
$$\beta = 16 \text{ mils}$$

then $$K'' \text{ (upper)} = \frac{5K'}{2} + 2 \qquad (4a)$$

In a similar manner, the equations for the other values of K" can be derived.

$$K'' \text{ (lower)} = \left(\frac{CMU-CML}{C5-C1}\right)K' + \left(\frac{C1-CML}{C5-C1}\right)$$
$$= \frac{\alpha K'}{\beta} - \frac{1}{2} \qquad (5)$$

$$K'' \text{ (split)} = \left(\frac{CMU-CML}{C6-C5}\right)K' + \left(\frac{C5-CML}{C6-C5}\right)$$
$$= \frac{\alpha K'}{\alpha-\beta} + \frac{\frac{1}{2}\beta}{\alpha-\beta} \qquad (6)$$

$$K'' \text{ (doubler)} = \left(\frac{CMU-CML}{CMM-CML}\right)K' + \left(\frac{CML-CML}{CMM-CML}\right)$$
$$= 2K' \qquad (7)$$

In terms of the numerical example, these become $$K'' \text{ (lower)} = \frac{5K'}{2} - \frac{1}{2} \qquad (5a)$$

$$K'' \text{ (split)} = \frac{5K'}{3} + \frac{1}{3} \qquad (6a)$$

$$K'' \text{ (doubler)} = 2K' \qquad (7a)$$

Returning to FIGURE 13 it will be seen that the resistor RR is provided with a number of connections for short circuiting portions of its length, as well as with two connections for adding auxiliary resistances RRA and RRB to one of its ends, such connections being controlled by contacts of switches designated SP, LO, UP and DO which are suitably mounted in front of the operator. The resistance of resistor RR is assumed to be Z arbitrary units.

When switch SP is depressed for "split" operation, contacts SP1 and SP2 are operated to short out enough turns of resistor RR at its right hand end to leave Z1 units effective, and to add resistor RRB to its left hand end. In like manner switch DO for "doubler" operation closes contacts DO1 to leave Z2 active units, switch LO for "lower" operation closes contacts LO1 and LO2 to leave Z3–Z5 active units, and switch UP for "upper" operation closes contacts UP1 and UP2 to leave Z4 active units while adding resistor RRA to the end of resistor RR.

As already explained, the above equations, 4 to 7, for K" are written generally as $$K'' = WK' + V \qquad (8)$$

where W and V have the values above described.

To determine the resistance values required the following equations are applied.

$$\text{Final Total Resistance} = \frac{\text{Original Total Resistance}}{W} \quad (9)$$

$$\text{Added Resistance} = \frac{V}{N} \times \text{Final Total Resistance} \quad (10)$$

where N is a basic computer constant, the design maximum of $$\frac{\theta + \phi}{\alpha}$$

and, in the specific example given, is equal to 4.

Taking K″ (upper) as an example, where from Equation 4a $W = 5/2$ and $V = 2$, then from Equation 9

$$Z4 + RRA = \frac{2Z}{5}$$

and from Equation 10

$$RRA = \frac{2}{4}(Z4 + RRA)$$

solving these equations gives $$Z4 = RRA = 0.2Z$$

Solving similarly for the other Equations 5a to 7a for K″ (split)
$$Z1 = 0.55Z$$
and
$$RRB = 0.05Z$$
for K″ (lower)
$$Z3 = 0.45Z$$
and
$$Z5 = 0.05Z$$
for K″ (doubler)
$$Z2 = 0.5Z$$

When "split," "upper" or "lower" operation is adopted, the function ΔT is not normally used in the computer. The operator removes any value of ΔT which may have been applied by means of hand switch HS (or HS′). The effect of thus making ΔT=zero, is to make zero the function Q which normally forms a small part of the function K′. K′ then becomes equal to K. Loss of some accuracy in this regard is to be preferred to the larger errors that could occur due to feeding the computer a value of ΔT not properly related to the other variables. Alternatively, resistor RR13 (FIGURE 10) at which ΔT is fed into the system may be modified in a manner analogous to that herein described for resistors RR3 and RR21 to take into account the ratio between actual and assumed beam split.

However, when using "doubler" operation, it is desirable to decrease ΔT to one half of its own value, which is a convenient approximation for the operator. That is to say ΔT′=½ΔT will be used in solving Equation 3. This effect the operator may achieve either by turning shaft H15 manually, or by operating the hand switch HS until the desired value of ΔT′ equal to ½ΔT appears on timer TM.

FIGURE 14 shows a modified switching arrangement designed to afford a broader choice of the two selected points than the FIGURE 13 circuit. Lower point selection knob LPS is used to set ganged selector switches LPS1 and LPS2. Switch LPS1 connects one or another of the resistors RRC to RRG to the main resistor RR′. Switch LPS2 connects the end of resistor RR1 remote from switch LPS1 to one of a further ganged group of switches UPS1 to UPS6 operated by an upper point selection knob UPS. Each of switches UPS1 to UPS6 selects taps on resistor RR′ to short out a portion thereof in accordance with Equations 9 and 10. To simplify the drawing, only the connections for switch UPS1 are shown. Switches UPS2 to UPS6 will be similarly connected to taps distributed along resistor RR′ to provide each possible combination. When switch knob LPS is set for point CML and switch knob UPS is set for point CMU, i.e. the "normal" combination of points, the selected resistance which consists of a portion of resistor RR′ plus resistor RRG is equivalent to resistor RR. As with FIGURE 13, the device of FIGURE 14 is used in the computer as both resistors RR3 and RR21.

We claim:
1. A radar system comprising
    (a) means for emitting two closely vertically superposed, mutually divergent, generally horizontal, effectively continuous, upper and lower radar beams,
    (b) means for displaying echoes returned by a projectile travelling in a trajectory intersecting said upper and lower beams for derivation of at least two points of the group comprising
        (i) a point on the echo received from the lower edge of the lower beam,
        (ii) the corresponding point on the echo received from the upper edge of the lower beam,
        (iii) the corresponding point on the echo received from the lower edge of the upper beam,
        (iv) the corresponding point on the echo received from the upper edge of the upper beam,
        (v) the mean point between points (i) and (ii),
        (vi) the mean point between points (iii) and (iv), and
        (vii) the mean point between the series of echoes received from the lower beam and the series of echoes received from the upper beam,
    (c) means for determining range and azimuth values of a selected two of said points measured from the radar system in relation to a known azimuth datum,
    (d) a computer,
    (e) means for supplying the computer with said determined range and azimuth values and with the values of the angles each of said upper and lower beams makes with the horizontal and with the value of the angle a working plane makes with the horizontal,
    (f) said computer including means for calculating from said values supplied to it at least approximately a target range value from the radar system of a target point on said working plane through which such trajectory extends and a target azimuth value from the radar system of said target point in relation to said datum,
    (g) and said computer further including switching means operable to modify said calculating means in accordance with the combination of two points selected.
2. A radar system according to claim 1, wherein said computer comprises means for solving equations

$$Rm = R1 + K''\Delta R$$

and $$Am = A1 + K''\Delta A$$

where

Rm and Am are the target range and target azimuth values respectively,
R1 and A1 are the range and azimuth values respectively of the lower one of the two selected points,
ΔR and ΔA are the differences in range and azimuth between the two selected points, and $$K'' = WK + V$$

where $$K = \frac{\theta + \phi}{\alpha}$$

θ is the angle of sight to the horizontal of the center of the lower beam,
α is the angle between the centers of the upper and lower beams, φ is the angle of sight to the horizontal of a line in the working plane joining the radar system to the target point, $$W = \frac{\alpha}{\text{the vertical component of the angle subtended at the radar system by the two selected points}}$$

and $$V = \frac{\text{the vertical component of the angle subtended at the radar system by the lower selected point and point (v)}}{\text{the vertical component of the angle subtended at the radar system by the two selected points}}$$

3. A radar system according to claim 1, including means for determining the time interval ($\Delta T$) between passage of the projectile through corresponding points of the upper and lower beams, and wherein said computer comprises means for solving equations $$Rm = R1 + K''\left[\Delta R + \alpha\left(\theta + \frac{\alpha}{2}\right)Rm\right]$$

$$Am = A1 + K''\Delta A$$

where $$K'' = 2K'$$

$$K' = \frac{\theta + \phi}{\alpha} - \frac{g(K' + \frac{1}{2})^2(\Delta T')^2}{2\alpha Rm}$$

$Rm$ and $Am$ are the target range and target azimuth values respectively,

R1 and A1 are the range and azimuth values respectively of point (v), $\Delta R$ and $\Delta A$ are the differences in range and azimuth between points (v) and (vii), $g$ is the gravitational constant, $\theta$ is the angle of sight to the horizontal of the center of the lower beam, $\alpha$ is the angle between the centers of the upper and lower beams, $\phi$ is the angle of sight to the horizontal of a line in the working plane joining the radar system to the target point, and $$\Delta T' = \tfrac{1}{2}\Delta T$$

4. A method of locating a target point that is at the point of intersection of a working plane and the trajectory of a projectile, comprising (a) emitting from a radar system two closely vertically superposed, mutually divergent, generally horizontal, effectively continuous, upper and lower radar beams to intersect said trajectory, (b) determining the angle ($\theta$) the center of the lower beam makes with the horizontal, and the angle ($\alpha$) between the centers of the upper and lower beams, (c) estimating the angle ($\phi$) the line lying in the working plane and extending from the radar system to said target point makes with the horizontal, (d) displaying on a range-azimuth radar display echoes returned by said projectile during intersection of said upper and lower beams, (e) deriving at least two points of the group comprising (i) a point on the echo received from the lower edge of the lower beam, (ii) the corresponding point on the echo received from the upper edge of the lower beam, (iii) the corresponding point on the echo received from the upper edge of the lower beam, (iv) the corresponding point on the echo reecived from the upper edge of the lower beam, (v) the mean point between points (i) and (ii), (vi) the mean point between points (iii) and (iv), and (vii) the mean point between the series of echoes received from the lower beam and the series of echoes received from the upper beam, (f) selecting a combination of any two of said derived points other than the combination of points (v) and (vi), (g) and employing the differences in range and azimuth of the points so selected, together with the values of said angles, to solve the equations $$Rm = R1 + K''\Delta R$$
$$Am = A1 + K''\Delta A$$

where $Rm$ is the target range value of the target point from the radar system, $Am$ is the target azimuth value of the target point measured from the radar system in relation to a known azimuth datum, R1 is the range value of the lower of said selected points, A1 is the azimuth value of the lower of said selected points in relation to said datum, $\Delta R$ is the difference in range between said selected points, $\Delta A$ is the difference in azimuth between said selected points, and $$K'' = WK + V$$

where $$K = \frac{\theta + \phi}{\alpha}$$

$$W = \frac{\alpha}{\text{the vertical component of the angle subtended at the radar system by the two selected points}}$$

and $$V = \frac{\text{the vertical component of the angle subtended at the radar system by the lower selected point and point (v)}}{\text{the vertical component of the angle subtended at the radar system by the two selected points}}$$

5. A method of locating a target point that is at the point of intersection of a working plane and the trajectory of a projectile, comprising (a) emitting from a radar system two closely vertically superposed, mutually divergent, generally horizontal, effectively continuous, upper and lower radar beams to intersect said trajectory, (b) determining the angle ($\theta$) the center of the lower beam makes with the horizontal, the angle ($\alpha$) between the centers of the upper and lower beams, and the angle ($\beta$) of each beam width in the vertical direction, (c) estimating the angle ($\phi$) the line lying in the working plane and extending from the radar system to said target point makes with the horizontal, (d) displaying on a range-azimuth radar display echoes returned by said projectile during intersection of said upper and lower beams, (e) deriving a point on the echo received from the upper edge of the lower beam and the corresponding point on the echo received from the lower edge of the upper beam, (f) and employing the differences in range and azimuth of said points, together with the values of said angles, to solve the equations $$Rm = R1 + K''\Delta R$$
$$Am = A1 + K''\Delta A$$

where $Rm$ is the target range value of the target point from the radar system, $Am$ is the target azimuth value of the target point measured from the radar system in relation to a known azimuth datum, $R1$ is the range value of the first mentioned point, $A1$ is the azimuth value of said first mentioned point in relation to said datum, $\Delta R$ is the difference in range between said points, $\Delta A$ is the difference in azimuth between said points, and $$K''=WK+V$$

where $$K=\frac{\theta+\phi}{\alpha}$$

$$W=\frac{\alpha}{\alpha-\beta}$$

and $$V=\frac{\frac{1}{2}\beta}{\alpha-\beta}$$

6. A method of locating a target point that is at the point of intersection of a working plane and the trajectory of a projectile, comprising (a) emitting from a radar system two closely vertically superposed, mutually divergent, generally horizontal, effectively continuous, upper and lower radar beams to intersect said trajectory, (b) determining the angle ($\theta$) the center of the lower beam makes with the horizontal, the angle ($\alpha$) between the centers of the upper and lower beams, and the angle ($\beta$) of each beam width in the vertical direction, (c) estimating the angle ($\phi$) the line lying in the working plane and extending from the radar system to said target point makes with the horizontal, (d) displaying on a range-azimuth radar display echoes returned by said projectile during intersection of said upper and lower beams, (e) deriving a point on the echo received from the lower edge of the upper beam and the corresponding point on the echo received from the upper edge of the upper beam, (f) and employing the differences in range and azimuth of said points, together with the values of said angles, to solve the equations $$Rm=R1+K''\Delta R$$
$$Am=A1+K''\Delta A$$

where $Rm$ is the target range value of the target point from the radar system, $Am$ is the target azimuth value of the target point measured from the radar system in relation to a known azimuth datum, $R1$ is the range value of the first mentioned point, $A1$ is the azimuth value of said first mentioned point in relation to said datum, $\Delta R$ is the difference in range between said points, $\Delta A$ is the difference in azimuth between said points, and $$K''=WK+V$$

where $$K=\frac{\theta+\phi}{\alpha}$$

$$W=\frac{\alpha}{\beta}$$

and $$V=\frac{\alpha-\frac{1}{2}\beta}{\beta}$$

7. A method of locating a target point that is at the point of intersection of a working plane and the trajectory of a projectile, comprising (a) emitting from a radar system two closely vertically superposed, mutually divergent, generally horizontal, effectively continuous, upper and lower radar beams to intersect said trajectory, (b) determining the angle ($\theta$) the center of the lower beam makes with the horizontal, the angle ($\alpha$) between the centers of the upper and lower beams, and angle ($\beta$) of each beam width in the vertical direction, (c) estimating the angle ($\phi$) the line lying in the working plane and extending from the radar system to said target point makes with the horizontal, (d) displaying on a range-azimuth radar display echoes returned by said projectile during intersection of said upper and lower beams, (e) deriving a point on the echo received from the lower edge of the lower beam and the corresponding point on the echo received from the upper edge of the lower beam, (f) and employing the differences in range and azimuth of said points, together with the values of said angles, to solve the equations $$Rm=R1+K''\Delta R$$
$$Am=A1+K''\Delta A$$

where $Rm$ is the target range value of the target point from the radar system, $Am$ is the target azimuth value of the target point measured from the radar system in relation to a known azimuth datum, $R1$ is the range value of the first mentioned point, $A1$ is the azimuth value of said first mentioned point in relation to said datum, $\Delta R$ is the difference in range between said points, $\Delta A$ is the difference in azimuth between said point, and $$K''=WK+V$$

where $$K=\frac{\theta+\phi}{\alpha}$$

$$W=\frac{\alpha}{\beta}$$

and $$V=\frac{1}{2}$$

8. A method of locating a targe point of intersection of a working plane and the trajectory of a projectile, comprising (a) emitting from a radar system two closely vertically superposed, mutually divergent, generally horizontal, effectively continuous, upper and lower radar beams to intersect said trajectory, (b) determining the angle ($\theta$) the center of the lower beam makes with the horizontal, and the angle ($\alpha$) between the centers of the upper and lower beams, (c) estimating the angle ($\phi$) the line lying in the working plane and extending from the radar system to said target point makes with the horizontal, (d) displaying on a range-azimuth radar display echoes returned by said projectile during intersection of said upper and lower beams, (e) deriving the mean point of corresponding points on the echoes received from the lower and upper edges of the lower beam, (f) deriving the mean point between the series of echoes received from the lower beam and the series of echoes received from the upper beam, (g) measuring by observation of said echoes the time interval ($\Delta T$) between the projectile occupying a like position in each of said upper and lower beams, (h) and employing the differences in range and azimuth of said points, together with the values of said angles, to solve the equations $$Rm = R1 + K''\left[\Delta R + \alpha\left(\theta + \frac{\alpha}{2}\right)Rm\right]$$

$$Am = A1 + K''\Delta A$$

where $$K'' = 2K'$$

$$K' = \frac{\theta + \phi}{\alpha} - \frac{g(K' + \frac{1}{2})^2(\Delta T')^2}{2\alpha Rm}$$

$$\Delta T' = \frac{1}{2}\Delta T$$

$Rm$ is the target range value of the target point from the radar system, $Am$ is the target azimuth value of the target point measured from the radar system in relation to a known azimuth datum, $R1$ is the range value of the first mentioned point, $A1$ is the azimuth value of said first mentioned point in relation to said datum, $\Delta R$ is the difference in range between said points, and $\Delta A$ is the difference in azimuth between said points.

References Cited by the Examiner

UNITED STATES PATENTS 2,939,134  5/60  Van Atta _____ 343—7

CHESTER L. JUSTUS, *Primary Examiner.*